US012657300B2

(12) United States Patent
Han et al.

(10) Patent No.: US 12,657,300 B2
(45) Date of Patent: Jun. 16, 2026

(54) METHOD FOR DETECTING MEMORY SAFETY BUG AND ELECTRONIC DEVICE SUPPORTING THE SAME

(71) Applicant: Samsung Electronics Co., Ltd., Suwon-si (KR)

(72) Inventors: Chankyu Han, Suwon-si (KR); Jihyuk Lim, Suwon-si (KR); Chiyang Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 18/896,018

(22) Filed: Sep. 25, 2024

(65) Prior Publication Data

US 2025/0094588 A1 Mar. 20, 2025

Related U.S. Application Data

(63) Continuation of application No. PCT/KR2024/013883, filed on Sep. 12, 2024.

(30) Foreign Application Priority Data

Sep. 19, 2023 (KR) ......................... 10-2023-0124768
Nov. 30, 2023 (KR) ......................... 10-2023-0170319

(51) Int. Cl.
*G06F 21/56* (2013.01)
*G06F 12/02* (2006.01)

(52) U.S. Cl.
CPC .......... *G06F 21/566* (2013.01); *G06F 12/023* (2013.01); *G06F 2221/034* (2013.01)

(58) Field of Classification Search
CPC ................. G06F 21/566; G06F 12/023; G06F 2221/034; G06F 12/1466; G06F 2212/1052; G06F 12/1491
See application file for complete search history.

(56) References Cited

U.S. PATENT DOCUMENTS 11,442,771 B2 9/2022 Krueger
11,972,126 B2 4/2024 Durham et al.
(Continued)

FOREIGN PATENT DOCUMENTS

CN 114417395 A 4/2022
KR 10-2000-0049990 A 8/2000
(Continued)

OTHER PUBLICATIONS

International Search Report dated Dec. 16, 2024, issued in International Application No. PCT/KR2024/013883.
(Continued)

*Primary Examiner* — Linglan Edwards
*Assistant Examiner* — Saron Matthewos Worku
(74) *Attorney, Agent, or Firm* — Jefferson IP Law, LLP

(57) ABSTRACT

A method for detecting a memory safety bug and an electronic device supporting the same are provided. The electronic device supporting multiple domains includes memory storing one or more computer programs, and one or more processors communicatively coupled to the memory and operable in a first domain and a second domain, wherein The one or more computer programs include computer-executable instructions that, when executed by the one or more processors individually or collectively, cause the electronic device to detect a shared memory use request by the first domain or the second domain, allocate shared memory for communication between multiple domains including the first domain and the second domain based on a memory area designated in the memory, based on the shared memory use request, register a tag for the shared memory in a first memory area of the first domain and a second memory area of the second domain, and detect a memory safety bug for the shared memory shared between the first domain and the second domain, based on the tag.

20 Claims, 12 Drawing Sheets

(56) References Cited

U.S. PATENT DOCUMENTS

| | | | |
|---|---|---|---|
| 2009/0182860 A1 | | 7/2009 | Hwang et al. |
| 2011/0277038 A1* | 11/2011 | Sahita .................. G06F 21/6281 |
| | | | 718/1 |
| 2015/0058997 A1* | 2/2015 | Lee ..................... G06F 9/45558 |
| | | | 726/26 |
| 2015/0089069 A1 | | 3/2015 | Kang et al. |
| 2017/0083255 A1* | 3/2017 | Chiricescu .............. G06F 21/55 |
| 2019/0042799 A1 | | 2/2019 | Durham et al. |
| 2021/0019264 A1 | | 1/2021 | Patel et al. |
| 2021/0349634 A1 | | 11/2021 | Durham |
| 2022/0318158 A1 | | 10/2022 | Durham et al. |
| 2023/0119005 A1 | | 4/2023 | Lee et al. |
| 2023/0393769 A1* | 12/2023 | Durham .............. G06F 12/0875 |

FOREIGN PATENT DOCUMENTS

| | | | | | |
|---|---|---|---|---|---|
| KR | 10-2009-0078563 A | | 7/2009 | | |
| KR | 20090078563 A | * | 7/2009 | .......... | G06F 21/606 |
| KR | 10-2132218 B1 | | 7/2020 | | |

OTHER PUBLICATIONS

Chen, Mitigating Memory-Safety Bugs with Efficient Out-of-Process Integrity Checking, Jun. 2021.
Yechan Bae et al., RUDRA: Finding Memory Safety Bugs in Rust at the Ecosystem Scale, Oct. 26, 2021.

* cited by examiner

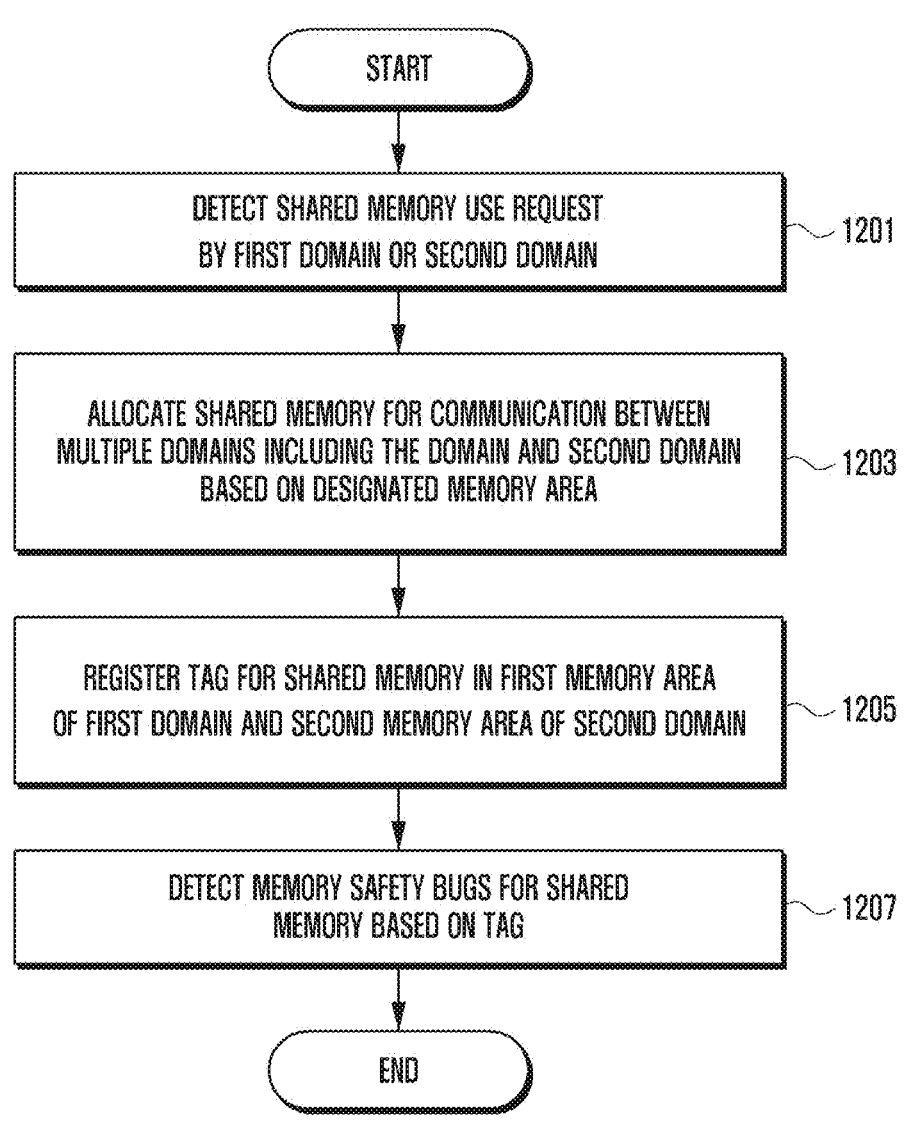

START

DETECT SHARED MEMORY USE REQUEST
BY FIRST DOMAIN OR SECOND DOMAIN —— 1201

ALLOCATE SHARED MEMORY FOR COMMUNICATION BETWEEN
MULTIPLE DOMAINS INCLUDING THE DOMAIN AND SECOND DOMAIN —— 1203
BASED ON DESIGNATED MEMORY AREA

REGISTER TAG FOR SHARED MEMORY IN FIRST MEMORY AREA
OF FIRST DOMAIN AND SECOND MEMORY AREA OF SECOND DOMAIN —— 1205

DETECT MEMORY SAFETY BUGS FOR SHARED
MEMORY BASED ON TAG —— 1207

END

METHOD FOR DETECTING MEMORY SAFETY BUG AND ELECTRONIC DEVICE SUPPORTING THE SAME

CROSS-REFERENCE TO RELATED APPLICATION(S)

This application is a continuation application, claiming priority under § 365(c), of an International application No. PCT/KR2024/013883, filed on Sep. 12, 2024, which is based on and claims the benefit of a Korean patent application number 10-2023-0124768, filed on Sep. 19, 2023, in the Korean Intellectual Property Office, and of a Korean patent application number 10-2023-0170319, filed on Nov. 30, 2023, in the Korean Intellectual Property Office, the disclosure of each of which is incorporated by reference herein in its entirety.

TECHNICAL FIELD

The disclosure relates to a method for detecting a memory safety bug and an electronic device supporting the same.

BACKGROUND ART

With the development of digital technology, various types of electronic devices such as smartphones, digital cameras, and/or wearable devices are widely used. In order to support and increase the functionality of electronic devices, the hardware and/or software portions of electronic devices are continuously being developed.

Portable electronic devices (hereinafter referred to as "electronic devices") represented by smartphones may be equipped with various applications (or functions), and the use of memory for data used in various applications may increase. As the use of the memory increases in electronic devices, issues regarding ensuring memory safety (or memory security) are being raised. For example, electronic devices may have memory security vulnerabilities due to memory safety bugs. For example, a memory safety bug may have a negative impact on the quality and stability of electronic devices, and may account for a significant portion of the abnormal terminations observed in electronic devices.

The above-described information may be provided as a related art for the purpose of helping understanding of the disclosure. No claim or determination is raised as to whether any of the foregoing may be applied as prior art related to the disclosure.

Accordingly, there may be a need to provide technology that may enhance the security of memory by detecting (or sensing) a memory security bug in electronic devices.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a method for detecting a memory safety bug in an electronic device and the electronic device supporting the same.

Another aspect of the disclosure is to provide a method for detecting a memory safety bug in a multiple domain environment within an electronic device and the electronic device supporting the same.

Another aspect of the disclosure is to provide a method for detecting a memory safety bug between multiple domains using memory tagging extension (MTE) in an electronic device supporting multiple domains, and the electronic device supporting the same.

Additional aspects will be set forth in part in the description which follows and, part, will be apparent from the description, or may be learned by practice of the presented embodiments.

Solution to Problem

In accordance with an aspect of the disclosure, an electronic device supporting multiple domains is provided. The electronic device includes memory storing one or more computer programs, and one or more processors communicatively coupled to the memory and operable in a first domain and a second domain and comprising processing circuitry, wherein the one or more computer programs include computer-executable instructions that, when executed by the one or more processors individually or collectively, cause the electronic device to detect a shared memory use request by the first domain or the second domain, allocate shared memory for communication between multiple domains including the first domain and the second domain based on a memory area designated in the memory, based on the shared memory use request, register a tag for the shared memory in a first memory area of the first domain and a second memory area of the second domain, and detect a memory safety bug for the shared memory shared between the first domain and the second domain, based on the tag.

In accordance with another aspect of the disclosure, a method of operating an electronic device supporting multiple domains is provided. The method includes detecting a shared memory use request by the first domain or the second domain, allocating shared memory for communication between multiple domains including the first domain and the second domain based on a memory area designated in the memory, based on the shared memory use request, registering a tag for the shared memory in a first memory area of the first domain and a second memory area of the second domain, and detecting a memory safety bug for the shared memory shared between the first domain and the second domain, based on the tag.

In order to address the above issues, various embodiments of the disclosure may include a computer-readable recording medium on which a program for executing the method in a processor is recorded.

In accordance with another aspect of the disclosure, one or more non-transitory computer-readable storage media storing computer-executable instructions that, when executed by one or more processors of an electronic device individually or collectively, cause the one or more processors to perform operations are provided. The operations include detecting a shared memory use request by the first domain or the second domain, allocating shared memory for communication between multiple domains including the first domain and the second domain based on a memory area designated in the memory, based on the shared memory use request, registering a tag for the shared memory in a first memory area of the first domain and a second memory area of the second domain, and detecting a memory safety bug for the shared memory shared between the first domain and the second domain, based on the tag.

Advantageous Effects of Invention

According to an embodiment of the disclosure, memory shared between multiple domains may also be protected by memory tagging extension (MTE). According to an embodiment of the disclosure, it is possible to improve security by effectively detecting a memory safety bug that may occur in a multiple domain environment.

According to an embodiment of the disclosure, in a multiple domain environment in which a first domain (e.g., Android) operating as a host exists as a primary in an electronic device and a second domain (e.g., additional environments, such as TrustZone, Virtual Machine, secure element, and/or secure processor/secure execution environment (SEE)) operates, when communication between multiple domains is required through shared memory, it may be implemented so that there is no interference with the shared memory in multiple domains. According to an embodiment of the disclosure, it is possible to improve the user's convenience in using an electronic device by effectively detecting a memory safety bug to prevent abnormal termination due to a memory safety bug.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

FIG. 12 is a flowchart illustrating a method of operating an electronic device according to an embodiment of the disclosure.

Throughout the drawings, it should be noted that like reference numbers are used to depict the same or similar elements, features, and structures.

MODE FOR THE INVENTION

Figure 2:
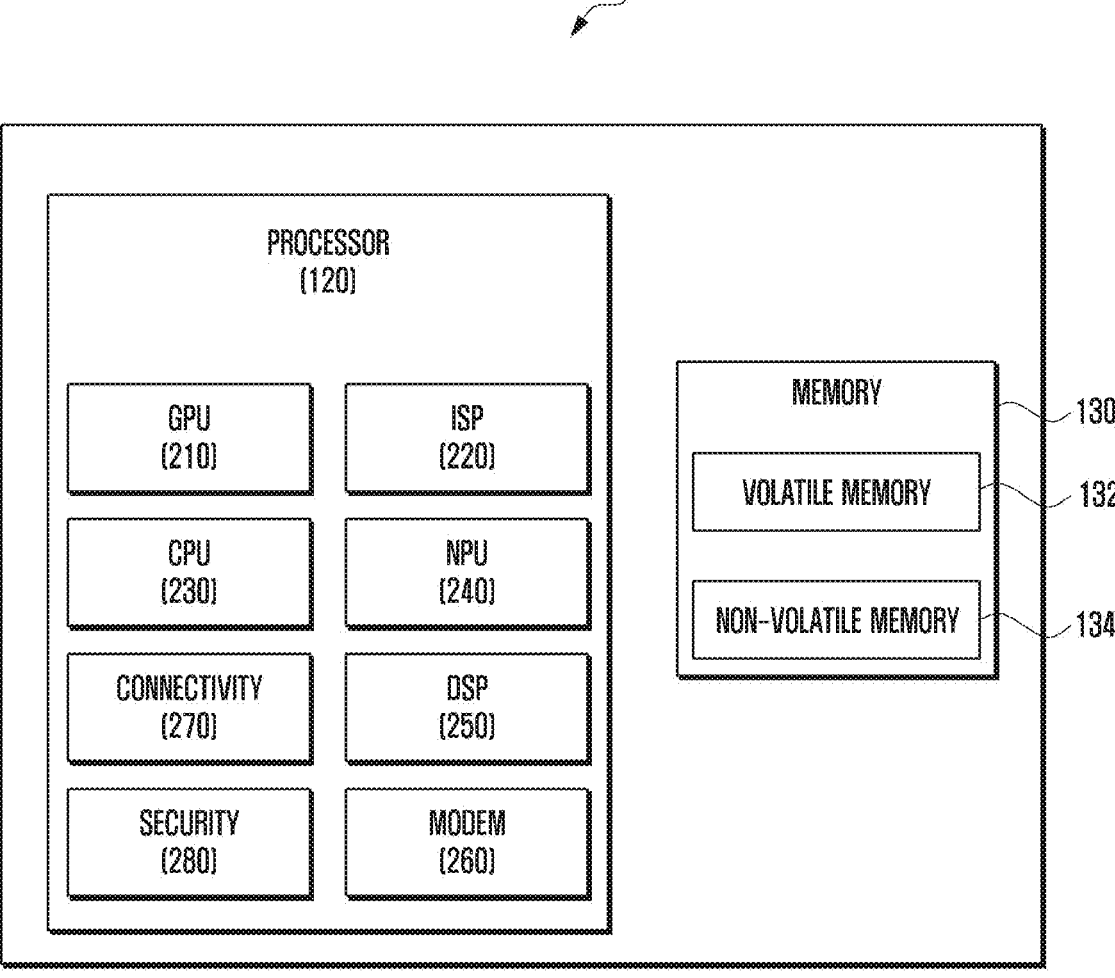
FIG. 2 is a diagram schematically illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
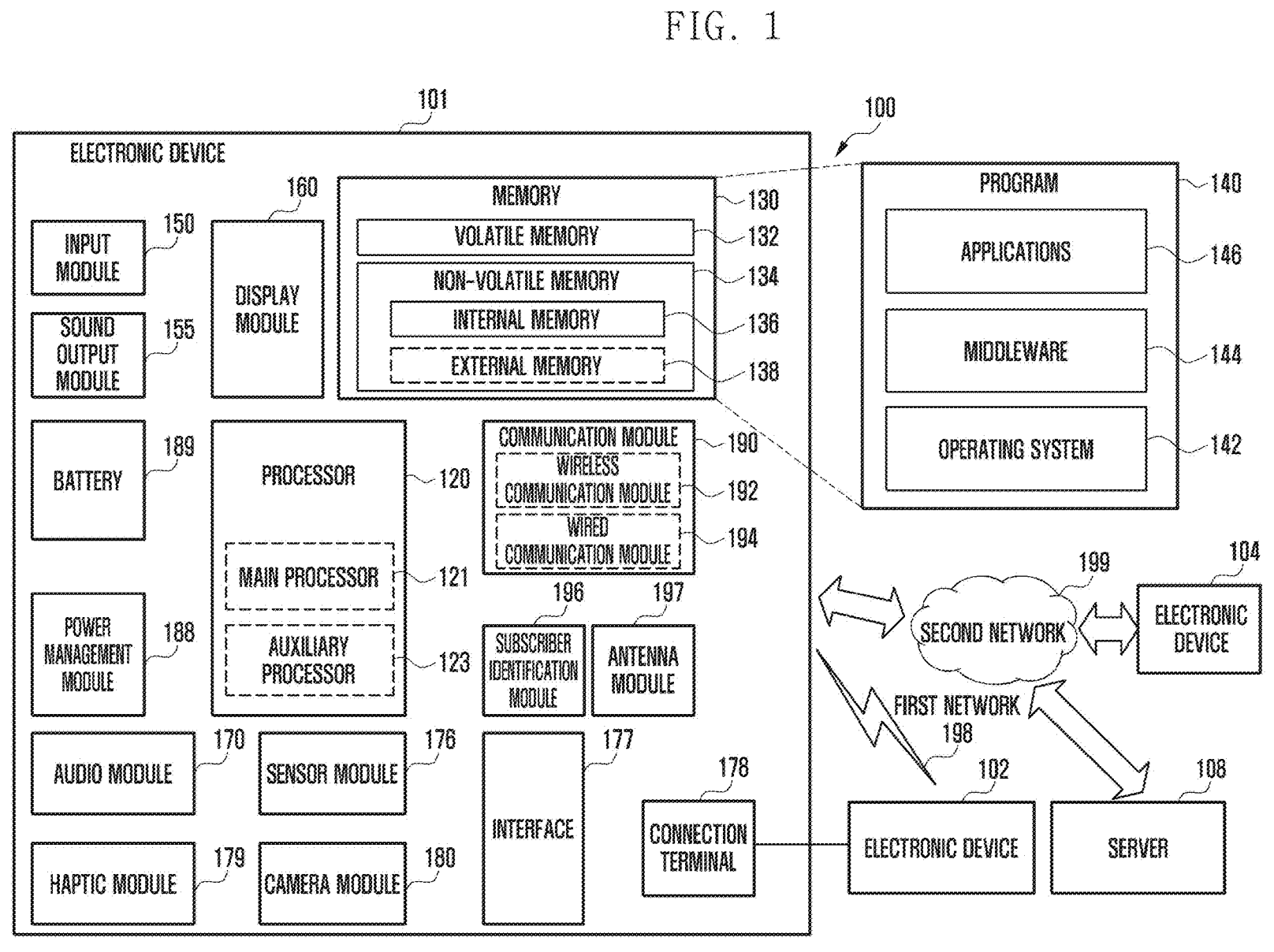

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments of the disclosure, at least one of the components (e.g., the connecting terminal 178) may be omitted from the electronic device 101, or one or more other components may be added in the electronic device 101. In various embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

FIG. 2 is a diagram schematically illustrating a configuration of an electronic device according to an embodiment of the disclosure.

Referring to FIG. 2, the electronic device 101 according to an embodiment of the disclosure may include memory 130 (e.g., the memory 130 of FIG. 1) and a processor 120 (e.g., the processor 120 of FIG. 1). According to an embodiment of the disclosure, the electronic device 101 may include all or at least some of the components of the electronic device 101 as described in the description with reference to FIG. 1.

According to an embodiment of the disclosure, the memory 130 may correspond to the memory 130 of FIG. 1. According to an embodiment of the disclosure, the memory 130 may store various data used by at least one component (e.g., the processor 120) of the electronic device 101. In an embodiment of the disclosure, data may include, for example, software (e.g., the program 140 of FIG. 1 (e.g., the operating system 142, the middleware 144, and/or the application 146 of FIG. 1)) and input data or output data for commands related to the software.

According to an embodiment of the disclosure, the memory 130 may include a volatile memory 132 (e.g., the volatile memory 132 of FIG. 1) or a non-volatile memory 134 (e.g., the non-volatile memory 134 of FIG. 1). According to an embodiment of the disclosure, the memory 130 may store commands or data received from the processor 120 in the volatile memory 132, and store resulting data that commands or data stored in the volatile memory 132 have been processed by processor 120 in the non-volatile memory 134.

According to an embodiment of the disclosure, the memory 130 may be a dynamic memory (e.g., volatile memory, RAM, or DRAM) that may manage memory areas for software based on memory allocation or memory deallocation. According to an embodiment of the disclosure, the memory 130 may be protected (e.g., preventing memory processing errors in programming languages) through memory tagging extension (MTE) technology. In an embodiment of the disclosure, the MTE technology is described with reference to the drawings described later.

According to an embodiment of the disclosure, the memory 130 may store instructions that cause the processor 120 to operate when executed. For example, instructions may be stored as software (e.g., the program 140 of FIG. 1) on the memory 130 and may be executable by the processor 120.

According to an embodiment of the disclosure, the processor 120 may perform application layer processing functions required by the user of the electronic device 101. According to an embodiment of the disclosure, the processor 120 may function control and commands for various blocks of the electronic device 101. According to an embodiment of the disclosure, the processor 120 may perform a calculation or data processing related to control and/or communication of each component of the electronic device 101. For example, the processor 120 may include at least some of the components and/or functions of the processor 120 of FIG. 1. According to an embodiment of the disclosure, the processor 120 may be operatively connected to components of the electronic device 101. According to an embodiment of the disclosure, the processor 120 may load commands or data received from other components of the electronic device 101 into the memory 130, process commands or data stored in the memory 130, and store the resulting data.

According to an embodiment of the disclosure, the processor 120 may processing circuitry and/or executable program elements. According to an embodiment of the disclosure, the processor 120 may control (or process) overall operations related to detecting a memory safety bug in a multiple domain environment based on processing circuitry and/or executable program elements.

According to an embodiment of the disclosure, the processor 120 may perform operations corresponding to a control module (or controller) (e.g., a control module 800 of FIG. 8) described later.

According to an embodiment of the disclosure, detailed operations of the processor 120 (or control module 800) of the electronic device 101 will be described with reference to the drawings described later.

According to an embodiment of the disclosure, the processor 120 may operate individually and/or collectively.

According to an embodiment of the disclosure, the processor 120 may include an application processor and/or a communication processor. According to an embodiment of the disclosure, the communication processor may be included and operated in a communication circuit.

According to an embodiment of the disclosure, the processor 120 may be an application processor (AP). According to an embodiment of the disclosure, the processor 120 may be a system semiconductor that performs calculation and multimedia driving functions of the electronic device 101. According to an embodiment of the disclosure, the processor 120 may be configured in the form of a system-on-chip (SoC), and may include a technology-intensive semiconductor chip that integrates multiple semiconductor technologies and implements system blocks into one chip.

According to an embodiment of the disclosure, as illustrated in FIG. 2, the system blocks of the processor 120 may include a graphics processing unit (GPU) 210, an image signal processor (ISP) 220, a central processing unit (CPU) 230, a neural processing unit (NPU) 240, a digital signal processor (DSP) 250, a modem 260, a connectivity block 270, and/or a security block 280.

According to an embodiment of the disclosure, the GPU 210 may perform graphics processing. According to an embodiment of the disclosure, the GPU 210 may perform graphics processing to express the shape, position, color, shading, movement, and/or texture of objects (or things) on the display by receiving commands from the CPU.

According to an embodiment of the disclosure, the ISP 220 may perform image processing and correction of images and videos. According to an embodiment of the disclosure, the ISP 220 may correct unprocessed data (e.g., raw data) transmitted from the image sensor of a camera (e.g., the camera module 180 of FIG. 1) to generate an image in a form more preferred by the user. According to an embodiment of the disclosure, the ISP 220 may perform post-processing such as adjusting partial brightness of the image and emphasizing details. For example, the ISP 220 may generate a result preferred by the user through its own process of tuning and correcting the image quality of the image acquired through the camera.

According to an embodiment of the disclosure, the ISP 220 may support artificial intelligence (AI)-based image processing technology. According to an embodiment of the disclosure, the ISP 220 may support scene segmentation (e.g., image segmentation) technology that recognizes and/or classifies parts of the scene being photographed in conjunction with the NPU 240. For example, the ISP 220 may include a function of processing objects such as sky, bushes, and/or skin by applying different parameters. According to an embodiment of the disclosure, the ISP 220 may detect and display a human face or adjust the brightness, focus, and/or color of the image by using coordinates and information of the face when capturing an image through an artificial intelligence function.

According to an embodiment of the disclosure, the CPU 230 may perform functions corresponding to the processor 120. According to an embodiment of the disclosure, the CPU 230 may decode user commands, and perform arithmetic and logical calculations, and/or data processing. For example, the CPU 230 may perform functions such as memory, interpretation, calculation, and control. According to an embodiment of the disclosure, the CPU 230 may control the overall functions of the electronic device 101. For example, the CPU 230 may execute all software (e.g., the application 146 of FIG. 1) of the electronic device 101 on an operating system (e.g., the operating system 142 of FIG. 1) and control hardware devices. According to an embodiment of the disclosure, the CPU 230 may control the overall operation of the processor 120 to execute an application and perform neural network-based tasks required by the execution of the application.

According to an embodiment of the disclosure, the CPU 230 may store commands or data in the volatile memory 132 of the memory 130 as at least part of data processing or calculation, process the commands or data stored in the volatile memory 132, and store the resulting data in the nonvolatile memory 134 of the memory 130.

According to an embodiment of the disclosure, the CPU 230 may include one processor core (single core) or a plurality of processor cores (multi-core). According to an embodiment of the disclosure, the CPU 230 may be a programmable processor that stores executable instructions (e.g., instructions capable of performing calculations of the CPU 230) and executes the instructions. According to an embodiment of the disclosure, the CPU 230 may operate on multiple domains.

According to an embodiment of the disclosure, the CPU 230 may operate in multiple domain environments of a normal world (e.g., a non-secure world, a framework, or a non-secure environment) domain and a secure world (e.g., a security framework or a security environment) domain. In an embodiment of the disclosure, the domain of the secure world may include one or more domains (e.g., trusted OS, TrustZone, and/or virtualization framework). According to an embodiment of the disclosure, the CPU 230 may be shared between multiple domains. According to an embodiment of the disclosure, the CPU 230 may detect a memory safety bug in the shared memory of the memory 130 (e.g., dynamic memory) by using the memory tagging extension (MTE) that may detect a memory safety bug through the CPU 230. According to an embodiment of the disclosure, a detailed operation of detecting a memory safety bug will be described with reference to the drawings described below.

According to an embodiment of the disclosure, the NPU 240 may perform processing optimized for artificial intelligence deep-learning algorithms. According to an embodiment of the disclosure, the NPU 240 is a processor optimized for deep-learning algorithm calculations (e.g., artificial intelligence calculations), and may process big data quickly and efficiently like a human neural network. For example, the NPU 240 may be mainly used for artificial intelligence calculations. According to an embodiment of the disclosure, the NPU 240 may perform a process of automatically adjusting the focus by recognizing an object, environment, and/or person in the background when capturing an image through a camera, a process of automatically switching the photographing mode of the camera module 180 to the food mode when capturing pictures of food, and/or a process of erasing only unnecessary subjects from the photographed result.

According to an embodiment of the disclosure, the electronic device 101 may support integrated machine learning processing by interacting with all processors such as the GPU 210, ISP 220, CPU 230, and NPU 240.

According to an embodiment of the disclosure, the DSP 250 may represent an integrated circuit that helps process digital signals quickly. According to an embodiment of the disclosure, the DSP 250 may perform a high-speed processing function by converting an analog signal into a digital signal.

According to an embodiment of the disclosure, the modem 260 may enable the electronic device 101 to use various communication functions. For example, the modem 260 may support communications such as phone calls and data transmission and reception by exchanging signals with the base station. According to an embodiment of the disclosure, the modem 260 may include an integrated modem (e.g., a cellular modem, an LTE modem, a 5G modem, a 5G-Advanced modem, and a 6G modem) that supports communication technologies such as long term evolution (LTE) and 2G to 5G. According to an embodiment of the disclosure, the modem 260 may include an artificial intelligence modem to which an artificial intelligence algorithm is applied.

According to an embodiment of the disclosure, the connectivity 270 may support wireless data transmission based on IEEE 802.11. According to an embodiment of the disclosure, the connectivity 270 may support communication services based on IEEE 802.11 (e.g., Wi-Fi) and/or 802.15 (e.g., Bluetooth, ZigBee, UWB). For example, the connectivity 270 may support communication services for an unspecified number of people in a localized area, such as indoors by using an unlicensed band.

According to an embodiment of the disclosure, the security 280 may provide an independent security execution environment between data or services stored in the electronic device 101. According to an embodiment of the disclosure, the security 280 may prevent hacking from occurring from the outside through security on software and hardware in the process of performing user authentication when providing services such as biometric recognition, mobile ID, and/or payment of the electronic device 101. For example, the security 280 may provide an independent security execution environment in device security for enhancing the security of the electronic device 101 and a security service based on user information such as a mobile ID, payment, and car key in the electronic device 101.

According to an embodiment of the disclosure, operations performed by the processor 120 (e.g., the CPU 230) may be implemented by executing instructions stored in a recording medium (or computer program product or storage medium). For example, the recording medium may include a non-transitory computer-readable recording medium on which programs for executing various operations performed by the processor 120 are recorded.

Embodiments described in the disclosure may be implemented in a computer or a readable recording medium that is a device similar to a computer by software, hardware, or a combination thereof. According to a hardware implementation, the operations described in an embodiment may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units to perform other functions.

In an embodiment of the disclosure, a computer-readable recording medium (or computer program product) recording a program that causes the electronic device 101 to perform (or execute) various operations is provided. The operations may include providing shared memory for communication between multiple domains based on a memory area designated in the memory 130, and detecting a memory safety bug for the shared memory shared between the multiple domains through hardware 430 and 760.

According to an embodiment of the disclosure, the operations may include receiving a shared memory allocation request from the first domain of the multiple domains, managing a table for address conversion and allocating tags for the shared memory through address conversion in the table, configuring a shared memory tag in the shared memory based on tag information related to the allocated tag, transmitting the shared memory allocation request to the second domain of the multiple domains, receiving a commit message from the second domain, determining whether the memory area requested for allocation in the first domain matches the memory area requested for allocation in the second domain, completing final registration for the shared memory when the memory areas requested for allocation match, and transmitting a registration completion response for the shared memory having the same shared memory tag in the first domain and the second domain to the first domain and the second domain.

Figure 3:
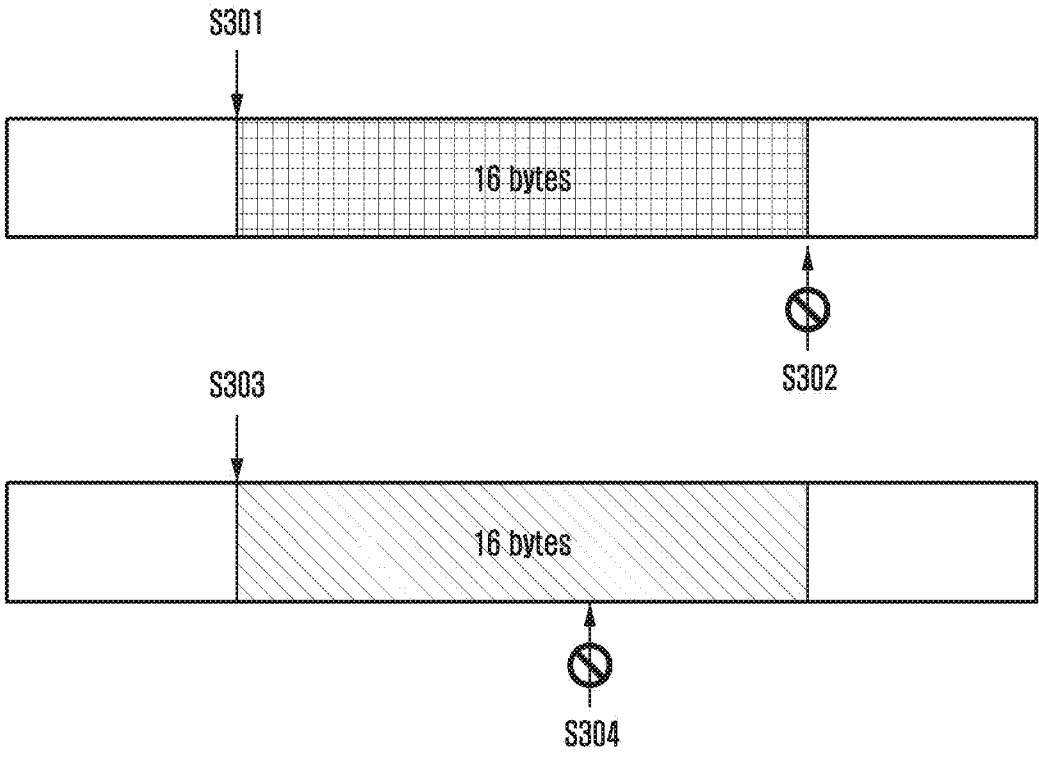
FIG. 3 is a diagram illustrating memory tagging extension (MTE) technology used to detect a memory safety bug in an electronic device according to an embodiment of the disclosure.

FIG. 3 is a diagram illustrating MTE technology used to detect a memory safety bug in an electronic device according to an embodiment of the disclosure.

Referring to FIG. 3, according to an embodiment of the disclosure, the memory tagging extension (MTE) technology is a technology (or function) that supports a memory protecting function (or solving memory safety issues) of the memory 130 (e.g., dynamic memory) in the electronic device 101, and for example, may be a technology (or function) that may effectively detect a memory safety bug using hardware (e.g., hardware 430 of FIG. 4) (e.g., the CPU 230, a memory management unit (MMU)). For example, the MTE technology may include technology that prevents a pointer (or variable) used to access a memory area (or memory space) from accessing a memory area other than the memory area requested for allocation.

According to an embodiment of the disclosure, the pointer may represent a variable (or function) that specifies an arbitrary address value (e.g., the address of a variable for reference) of the memory 130. For example, the pointer may refer to a variable (or function) that indicates another variable or to the memory area address (or memory space address) of the variable in a programming language.

According to an embodiment of the disclosure, FIG. 3 may illustrate an example of the basic operation of MTE technology. According to an embodiment of the disclosure, in FIG. 3, an example in which the access is allowed only to the corresponding memory area by allocating a memory area corresponding to 16 bytes of the memory area of the memory 130 and allocating a random tag to the corresponding memory area may be illustrated.

Referring to FIG. 3, in order to allow accessing the allocated area in the memory area (or space) of the memory 130 (e.g., the volatile memory 132 of FIG. 2, dynamic memory, RAM, or DRAM), a random tag (or tag value) may be allocated to the upper bits of the pointer, and the same tag may be allocated to the actual memory address when a pointer (or function or variable) address is allocated (S301). In an embodiment of the disclosure, the pointer address may include the first address (or first address value) (e.g., the starting address of the allocated size (e.g., 16 bytes) and the size (e.g., the size of the allocated memory area, such as 16 bytes) of the allocated memory area (or space). For example, the pointer address may be represented by {start, size}, and the point address may refer to a space of the byte to which the first address of the allocated byte is allocated. In an embodiment of the disclosure, the tag may be represented as one of the ways recognizable by software (e.g., the program 140 of FIG. 1), such as a designated color or a designated pattern, and for example, may be defined as a value such as a color value representing a designated color or a pattern value representing a designated pattern.

According to an embodiment of the disclosure, the color value may be defined based on a color code associated with various colors. According to an embodiment of the disclosure, the tag may be defined as a code such as "RRGGBB" indicating a designated color. For example, when the tag is represented by the color "red", the code "FF0000" indicating red may be used as the color value, when the tag is indicated by the color "blue", the code "0000FF" indicating blue may be used as the color value, when the tag is indicated by the color "black", the code "000000" indicating black may be used as the color value, and when the tag is indicated by the "white" color, the code "FFFFFFFF" indicating white may be used as the color value.

According to an embodiment of the disclosure, the pattern value may represent a value defining the pattern. For example, the pattern value may represent the form of a range value (e.g., (x, y) or (1, 2, . . . , n)) or the identifier of a pattern (e.g., n, n is a natural number) of a pattern that allows software (e.g., the program 140 of FIG. 1) to process (or understand) the structure (e.g., pattern) of a value rather than the form of a specific value.

Thereafter, when an access (S302) occurs beyond a memory area allocated to the corresponding pointer (e.g., an address value area allocated to the corresponding pointer) by using the pointer, access to the memory area outside the memory area requested for allocation may not be permitted because the tag of the memory area outside the memory area requested for allocation is different from the previously allocated tag. For example, when the tag use a designated pointer, it is easier to detect (e.g., memory safety bug detection) the incorrect use of the pointer's top byte, thereby denying (or rejecting) the corresponding access. For example, detection of a memory safety bug may include detecting access to a memory area other than the memory area allocated by memory tagging (e.g., MTE).

In addition, when the pointer is deallocated from the allocated memory area (S303), the corresponding memory area may also be changed and set to another tag (or tag value). Accordingly, subsequent access to the corresponding memory area using the same pointer may be denied (S304). For example, after pointer deallocation, access using the same pointer may no longer be allowed because the tag value is configured differently even within the memory area of the previously assigned address value.

According to an embodiment of the disclosure, the MTE technology is a technology to solve memory safety issues, and may operate by tagging an allocation-requested memory area. Hardware (e.g., the CPU 230 of FIG. 2) may automatically identify whether the correct tag is used whenever memory access occurs in an application (e.g., applications in the non-secure world or applications (e.g., trusted services) in the secure world.

Figure 4:
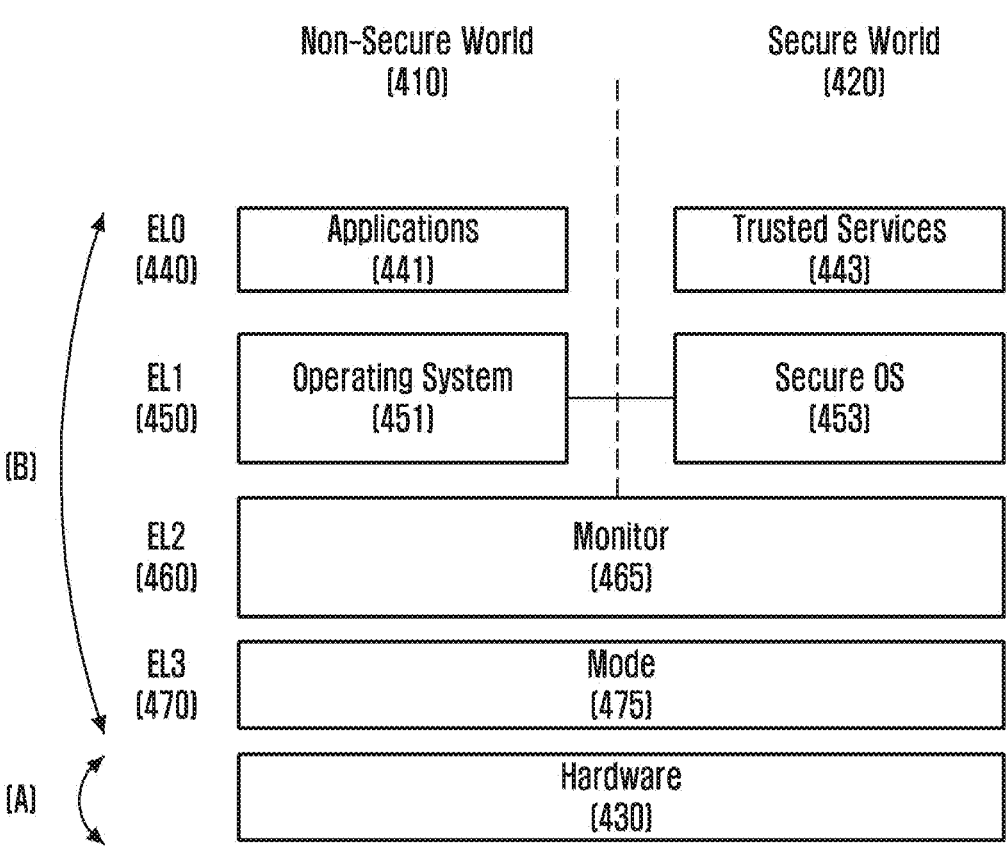
FIG. 4 is a diagram illustrating an architecture in an electronic device according to an embodiment of the disclosure.

FIG. 4 is a diagram illustrating an architecture in an electronic device according to an embodiment of the disclosure.

Referring to FIG. 4, the architecture (or framework) of the electronic device 101 according to an embodiment may be divided into a hardware layer (A) and a software layer (B).

In an embodiment of the disclosure, the hardware layer (A) may include hardware 430 included in the electronic device 101. According to an embodiment of the disclosure, the hardware 430 may include a processor 120 (e.g., the CPU 230 of FIG. 2) and/or an MMU (not illustrated). According to an embodiment of the disclosure, the hardware 430 (e.g., the CPU 230 of FIG. 2) may store instructions (e.g., executable instructions or CPU instructions) capable of performing calculations on functions related to pointer allocation/deallocation (e.g., load, store, add, sub, jump, halt, access, mov (move), push, and pop). According to an embodiment of the disclosure, the hardware 430 (e.g., the CPU 230 of FIG. 2) may read and compare tags in the memory area and the pointer for each instruction approaching the memory area. For example, the hardware 430 (e.g., the CPU 230 of FIG. 2) may identify whether the correct tag is used whenever memory access occurs in an application (e.g., applications in the non-secure world or applications (e.g., trusted services) in the secure world).

In an embodiment of the disclosure, the software layer (B) may be implemented through software (e.g., mainly memory management and allocator (e.g., memory allocator)) that calls instructions to allocate or deallocate tags accordingly when allocating or deallocating a pointer. According to an embodiment of the disclosure, the software layer (B) may include an exception level 0 (EL0) layer 440, an EL1 layer 450, an EL2 layer 460, and an EL3 layer 470. According to an embodiment of the disclosure, the EL0 layer 440 may include an application layer. According to an embodiment of the disclosure, the EL1 layer 450 may include an operating system layer. According to an embodiment of the disclosure, the EL2 layer 460 may include a virtualization layer (or mode layer). According to an embodiment of the disclosure, the EL3 layer 470 may include a monitor layer.

According to an embodiment of the disclosure, trusted execution environments (TEE) may be divided between the EL0 layer 440 and the EL1 layer 450. For example, the EL0 layer 440 and the EL1 layer 450 may be divided into two worlds such as a non-secure (NS) world 410 (or non-secure environment, normal world, or framework) and a secure (S) world 420 (or security environment, security framework). For example, two worlds may provide a multiple domain environment, such as a domain of the non-secure world 410 and one or more domains of the secure world 420.

In an embodiment of the disclosure, the EL0 layer 440 may include applications. In an embodiment of the disclosure, in the non-secure world 410, general applications (e.g., applications 441) may operate (or run), and in the secure world 420, trusted services (or applications) (e.g., trusted services 443), such as financial applications or services requiring information security, may operate (or run).

In an embodiment of the disclosure, the EL1 layer 450 may include an operating system. For example, an operating system may be required to run an application (or service). In an embodiment of the disclosure, in the non-secure world 410, a general operating system (e.g., operating system 451) (e.g., android, Linux kernel) may operate, and in the secure world 420, a trusted operating system (e.g., secure OS 453) (e.g., trusted OS, TrustZone, virtual machine, secure element) may operate.

In an embodiment of the disclosure, the EL2 layer 460 may support a mode 465 required to execute the operating system and/or applications (or service) of the EL1 layer 450. For example, the EL2 layer 460 may support a hypervisor mode (e.g., virtual machine monitor or virtual machine manager), which is a logical platform for running multiple operating systems (or multiple domains) simultaneously. According to an embodiment of the disclosure, the EL2 layer 460 may support a privileged mode related to detecting a memory safety bug in shared memory between multiple domains. In an embodiment of the disclosure, the hypervisor mode may be supported in the non-secure world 410 and/or the secure world 420, and the privileged mode may be supported in the secure world 420. In an embodiment of the disclosure, instructions that may be used in the hypervisor mode may be restricted, but in the privileged mode, all instructions of the hardware 430 may be possible without restrictions. According to an embodiment of the disclosure, an example of a configuration for supporting the privileged mode is described below.

In an embodiment of the disclosure, the EL3 layer 470 may include a monitor (e.g., a monitor 475), which is a class (or gate) for protecting information. According to an embodiment of the disclosure, the monitor 475 of the EL3 layer 470 may control switching between the non-secure world 410 and the secure world 420.

Referring to FIG. 4, the hardware 430 (e.g., the CPU 230 and an MMU) of the hardware layer (A) may be shared between multiple domains according to the non-secure world 410 and secure world 420, and the software of the software layer (B) may be separated into the non-secure world 410 and the secure world 420 in the EL0 layer 440 and EL1 layer 450, respectively.

Recently, as the security environment in the electronic device 101 has diversified, multiple security architectures/frameworks are supported. For example, in addition to the existing operating system-based mobile environment, a trust zone and a virtualization framework may be added as a security framework to support multiple domains (or frameworks) in electronic devices 101. This environment may be defined as a multiple domain environment. In the following, the MTE technology in a multiple domain environment is described.

Figure 5:
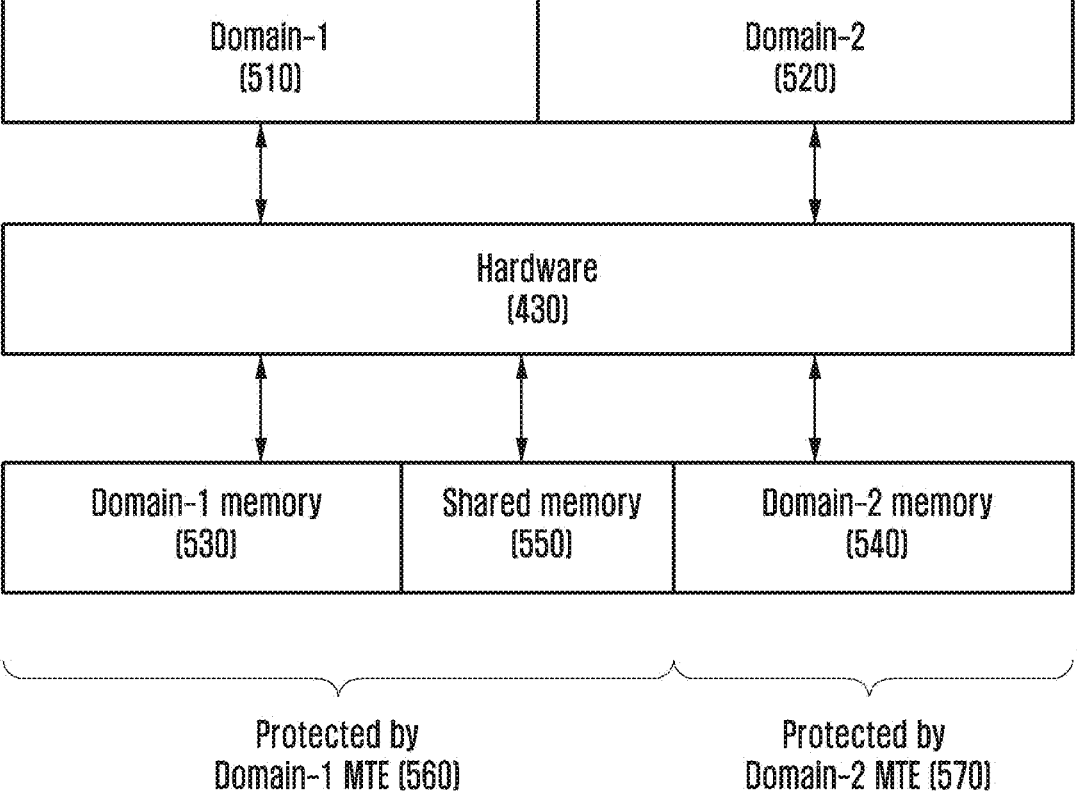
FIG. 5 is a diagram illustrating an operation for detecting a memory safety bug in a multiple domain environment supported by an electronic device according to an embodiment of the disclosure.
Figure 6:
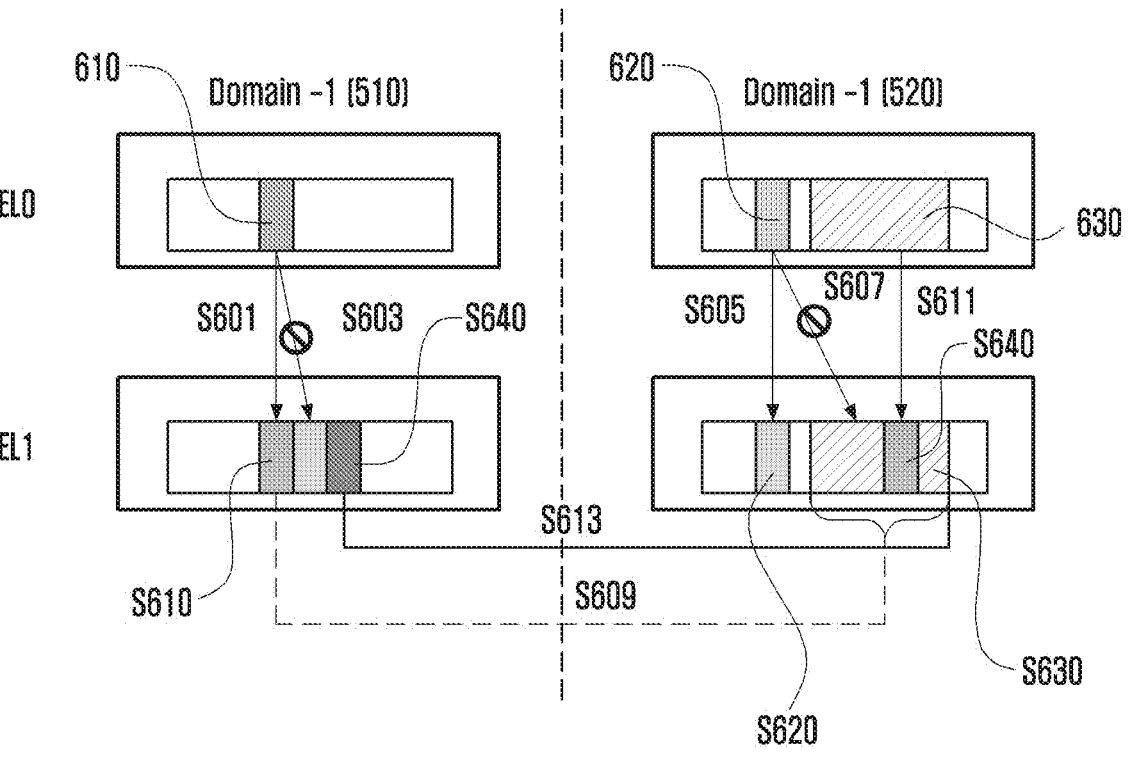
FIG. 6 is a diagram illustrating an operation for detecting a memory safety bug in a multiple domain environment supported by an electronic device according to an embodiment of the disclosure.

FIGS. 5 and 6 are diagrams illustrating an operation for detecting a memory safety bug in a multiple domain environment supported by an electronic device according to an embodiment of the disclosure.

Referring to FIGS. 5 and 6, it illustrate examples of security vulnerabilities of the MTE technology in a multiple domain environment divided into a first domain 510 and a second domain 520.

Referring to FIG. 5, MTE implementation in a multiple domain environment is that the first domain 510 (e.g., Domain-1) protects a memory area 530 (e.g., domain-1 memory) belonging to the first domain 510 (e.g., protected by domain-1 MTE 560), and the second domain 520 (e.g., Domain-2) protects a memory area 540 (e.g., domain-2 memory) belonging to the second domain 520 (e.g., protected by domain-2 MTE 570), and these may be managed through hardware 430 (e.g., MMU). In addition, a partial area of the memory 130 in the electronic device 101 called shared memory 550 (e.g., shared memory) may be designated between the first domain 510 and the second domain 520 to be used for communication between multiple domains (e.g., the first domain 510 and the second domain 520).

In an embodiment of the disclosure, the shared memory 550 may belong to a domain (e.g., the first domain 510 or the second domain 520) requesting communication. In an embodiment of the disclosure, FIG. 5 may illustrate an example in which communication is requested by the first domain 510 and the shared memory 550 belongs to the first domain 510.

According to an example of FIG. 5, the shared memory 550 may be allocated to the first domain 510 requesting communication and protected by a tag of the first domain 510. However, when the sanity and permission authorization for the part transmitted to the second domain 520 is insufficient, the memory safety bug may not be detected for the memory calculation requested by the second domain 520. For example, the shared memory 550 may be designated as a tag of the first domain 510, and pointer control requested by the second domain 520 may not be performed properly.

For example, since the shared memory 550 is not an allocated memory area in the second domain 520, the pointer requested from the second domain 520 may not include a tag (or tag information) for the shared memory 550. Accordingly, since the pointer requested by the second domain 520 does not include tag information, the shared memory 550 may not be protected by the MTE technology. For example, hardware 430 (e.g., MMU) belonging to the second domain 520 may not detect a memory safety bug. An example of this is illustrated in FIG. 6.

FIG. 6 is a diagram illustrating operations (8610, 8620, 8630, and 8640) for detecting a memory safety bug in a multiple domain environment supported by an electronic device according to an embodiment of the disclosure.

Referring to FIG. 6, for memory calculation (e.g., tag 610 tagging) allocated in the first domain 510 (e.g., domain-1), only normal memory access S601 is allowed due to the MTE of the first domain 510, and a memory safety bug S603 for which memory calculation is not permitted may be detectable by the MTE of the first domain 510. Likewise, for memory calculation (e.g., tag 620 (yellow color) tagging) allocated in the second domain 520 (e.g., domain-2), only normal memory access S605 is allowed due to the MTE of the second domain 520, and a memory safety bug S607 for which memory calculation is not permitted may be detectable by the MTE of the second domain 520.

According to an embodiment of the disclosure, referring to FIG. 6, when the first domain 510 registers with the operating system (e.g., secure OS, trusted OS) of the second domain 520 through the shared memory 550 (8609), memory calculation (e.g., the tag 610) allocated in the first domain 510 may not be tagged (e.g., hatched area 630) in the second domain 520. For example, the shared memory 550 may be simply mapped to hardware 430 (e.g., MMU) belonging to the second domain 520. In this case, the shared memory 550 may not be controlled by the first domain 510 and may be registered in the second domain 520 with a size larger than the allocated memory size (e.g., hatching area 630), and a memory safety bug S611 accessing through the shared memory 550 mapped in the second domain 520 may not be protected. For example, there is no tagged memory area in the second domain 520, and the shared memory 550 may not be protected by the MTEs of the first domain 510 and the second domain 520. Accordingly, in this case, an error may propagate (S613) from the second domain 520 to the first domain 510 due to memory calculation (e.g., tag 630 (e.g., red color) tagging) according to a malicious memory safety bug S611, and the memory (e.g., the memory area 530 belonging to the first domain 510 of FIG. 5) of the first domain 610 may be violated, exposed to a memory safety bug, and exploited.

As described above, registration of the shared memory 550 is difficult to control between multiple domains, and when registering the shared memory 550, shared memory (e.g., the hatching area 630) larger than the size allowed in the actual domain (e.g., the first domain 510 or the second domain 520) may be registered by the programmer's mistake or attack code, and other domains (e.g., the second domain 520 or the first domain 510) may not be able to distinguish thereof. Due to this memory safety bug (e.g., attack) undetected situation, a response to a user's input (e.g., identification information, financial information, or personal information) in a service executed in the second domain 520 may be leaked to the first domain 510. For example, in a situation where identification information (e.g., ID) is input through the shared memory 550, and then secret information (e.g., password, financial information, or personal information) is calculated in the second domain through a continuous memory area, the secret information may be propagated to the shared memory 550 through a memory safety bug, so that the user secret information may be exposed in the first domain 510.

According to an embodiment of the disclosure, the above describes an example for two multiple domains, a domain of the non-secure world and a domain of the secure world, but may include three or more multiple domain environments. For example, the domain of the secure world may include one or more domains. For example, when there are three or more domains, if memory calculations are registered from the first domain to the second and third domains for the same memory area, mutual memory safety between the second domain and the third domain may not be guaranteed due to the above-described security vulnerability. In this case, multiple error propagation situations such as the memory safety of the third domain is not guaranteed by the second domain may occur.

According to an embodiment of the disclosure, memory architecture configuration between multiple domains and software implementation method using MTE technology are provided to detect a memory safety bug in an environment where the domain environment within the electronic device 101 is diversified (e.g., a multiple domain environment).

Figure 7:
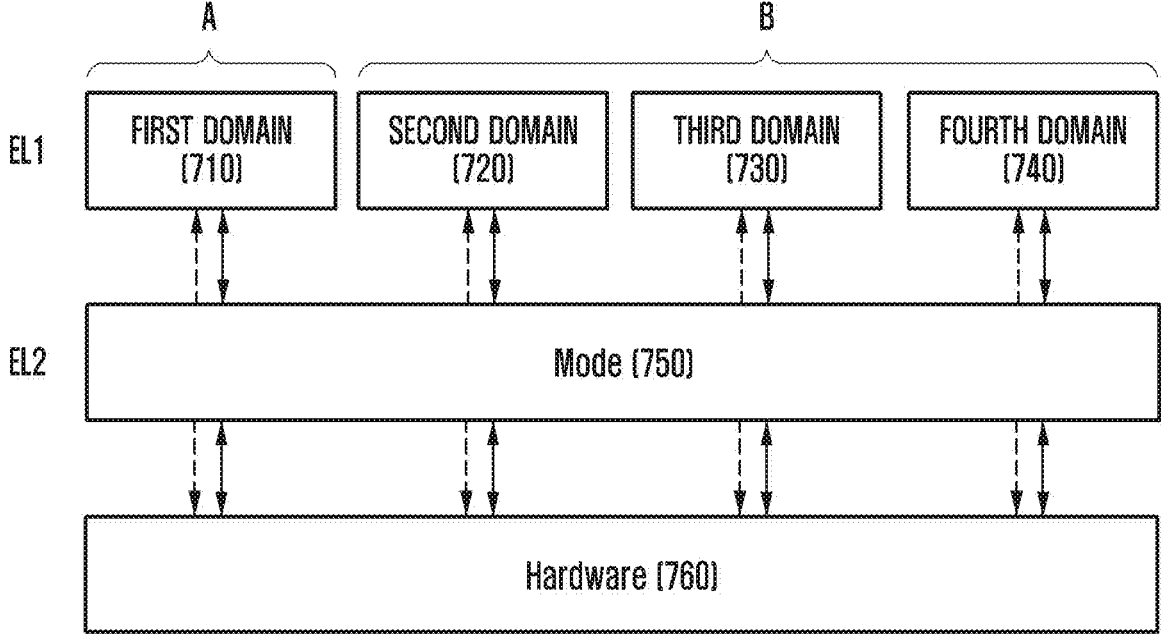
FIG. 7 is a diagram illustrating a method for supporting a memory safety bug between multiple domains in an electronic device according to an embodiment of the disclosure.

FIG. 7 is a diagram illustrating a method for supporting a memory safety bug between multiple domains in an electronic device according to an embodiment of the disclosure.

Figure 8:
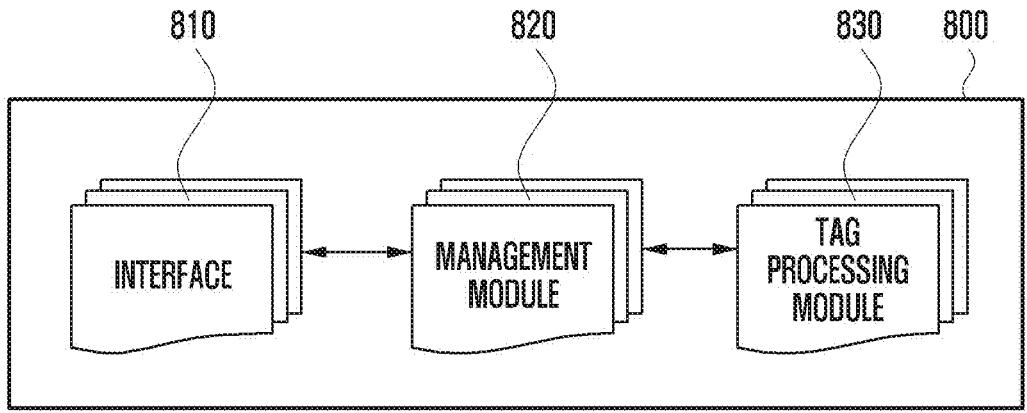
FIG. 8 is a diagram illustrating a configuration for supporting a memory safety bug between multiple domains in an electronic device according to an embodiment of the disclosure.

FIG. 8 is a diagram illustrating a configuration for supporting a memory safety bug between multiple domains in an electronic device according to an embodiment of the disclosure.

Referring to FIG. 7, FIG. 7 may illustrate an example of configuring an EL2 layer (e.g., the EL2 layer 460 of FIG. 4) for memory safety bug detection between multiple domains in the electronic device 101 supporting multiple domains, such as a first domain 710 (e.g., Linux kernel) of the non-secure world A and a second domain 720 (e.g., Trust-Zone), a third domain 730 (e.g., virtual machine) and a fourth domain 740 (e.g., secure element) of the secure world B.

The multiple domain environment according to an embodiment of the disclosure is not limited to the multiple domain environment illustrated in FIG. 7, and the multiple domain environment illustrated in FIG. 7 is only a specific example to help understanding of the disclosure, but is not intended to limit the scope of the disclosure. For example, a multiple domain environment may include other multiple domain environments not mentioned. According to an embodiment of the disclosure, a plurality of domains may exist in the non-secure world A, memory safety bug detection between the plurality of domains in the non-secure world A, memory safety bug detection between the plurality of domains in the secure world B, and/or detecting a memory safety bug between domains in the non-secure world A and domains in the secure world B may be implemented in various multiple domain environments based on a plurality of different domains, and is not limited to the above-described example.

Referring to FIG. 7, a multiple domain environment such as the first domain 710, the second domain 720, the third domain 730, and the fourth domain 740 may be configured in the EL1 layer, and the EL2 layer may support a plurality of modes 750 required to execute an operating system and/or application (or service) related to multiple domains 710, 720, 730, and 740. For example, the EL2 layer may support a hypervisor mode, which is a logical platform for executing multiple operating systems (or multiple domains) simultaneously, and a privileged mode, which is related to detecting a memory safety bug in shared memory between multiple domains. In an embodiment of the disclosure, the hypervisor mode may be supported in non-secure world A and/or secure world B, and the privileged mode may be supported in secure world B.

In an embodiment of the disclosure, in the hypervisor mode, usable commands may be restricted, but in the privileged mode, all commands of the hardware 760 may be possible without restrictions. For example, the electronic device 101 may perform limited operations of shared memory based on privileged mode operations in the EL2 layer. According to an embodiment of the disclosure, the electronic device 101 may include a control module (or controller) (e.g., the control module 800 of FIG. 8) to support the privileged mode. An example of this is illustrated in FIG. 8.

Referring to FIG. 8, the EL2 layer (e.g., the mode 750) may include a control module 800 to support the privileged mode allowing detecting of a memory safety bug in shared memory between multiple domains. According to an embodiment of the disclosure, the control module 800 may be a controller capable of monitoring and detecting a memory safety bug that invade multiple domains. For example, the control module 800 may perform operations to request, register, manage, and/or deny shared memory.

According to an embodiment of the disclosure, the control module 800 (or controller) may include an interface 810 (e.g., memory API interface), a management module (or manager) 820, and a tag processing module 830 (or tag agent) (e.g., shared memory tag). In an embodiment of the disclosure, the interface 810 may be configured to check memory requests, permissions, and tag information. In an embodiment of the disclosure, the management module 820 may be a manager that processes requests transmitted through interface 810. In an embodiment of the disclosure, the tag processing module 830 may be a tag agent that detects a memory safety bug for shared memory. According to an embodiment of the disclosure, the operation of detecting a memory safety bug for shared memory using the control module 800 is described with reference to the drawings described below.

Referring to FIGS. 7 and 8, as described above with reference to FIG. 5, the electronic device 101 according to an embodiment of the disclosure may protect a memory area belonging to the first domain 710 of the non-secure world A, and memory areas belonging to the second domain 720, third domain 730, and fourth domain 740 of secure world B. According to an embodiment of the disclosure, the electronic device 101 may manage and protect (e.g., an element 701) memory for memory areas belonging to each of multiple domains. For example, each of the domains 710, 720, 730, and 740 may monitor and detect a memory safety bug in the corresponding domain while transmitting instructions (e.g., CPU instructions) directly to the hardware 760 (e.g., MMU). For example, the operation according to the element 701 may represent the operation of detecting a memory safety bug by using the MTE in each domain.

According to an embodiment of the disclosure, as indicated by an element 702, the electronic device 101 may be configured to be managed by the control module 800 of the EL2 layer with respect to shared memory that is not managed in each of the domains 710, 720, 730, and 740, and to monitor and detect a memory safety bug in the shared memory invading between multiple domains. For example, an operation according to the element 702 may indicate an operation of detecting a memory safety bug by using MTE between multiple domains.

According to an embodiment of the disclosure, as indicated by the element 702, the electronic device 101 may include an operation of requesting, registering, managing, and rejecting shared memory through the control module 800. For example, in the electronic device 101, memory management/allocator corresponding to each domain 710, 720, 730, and 740 may be configured in the EL1 layer (e.g., an operating system layer). For example, in the electronic device 101, the control module 800 may be implemented in the EL2 layer (e.g., a mode layer).

Figure 9:
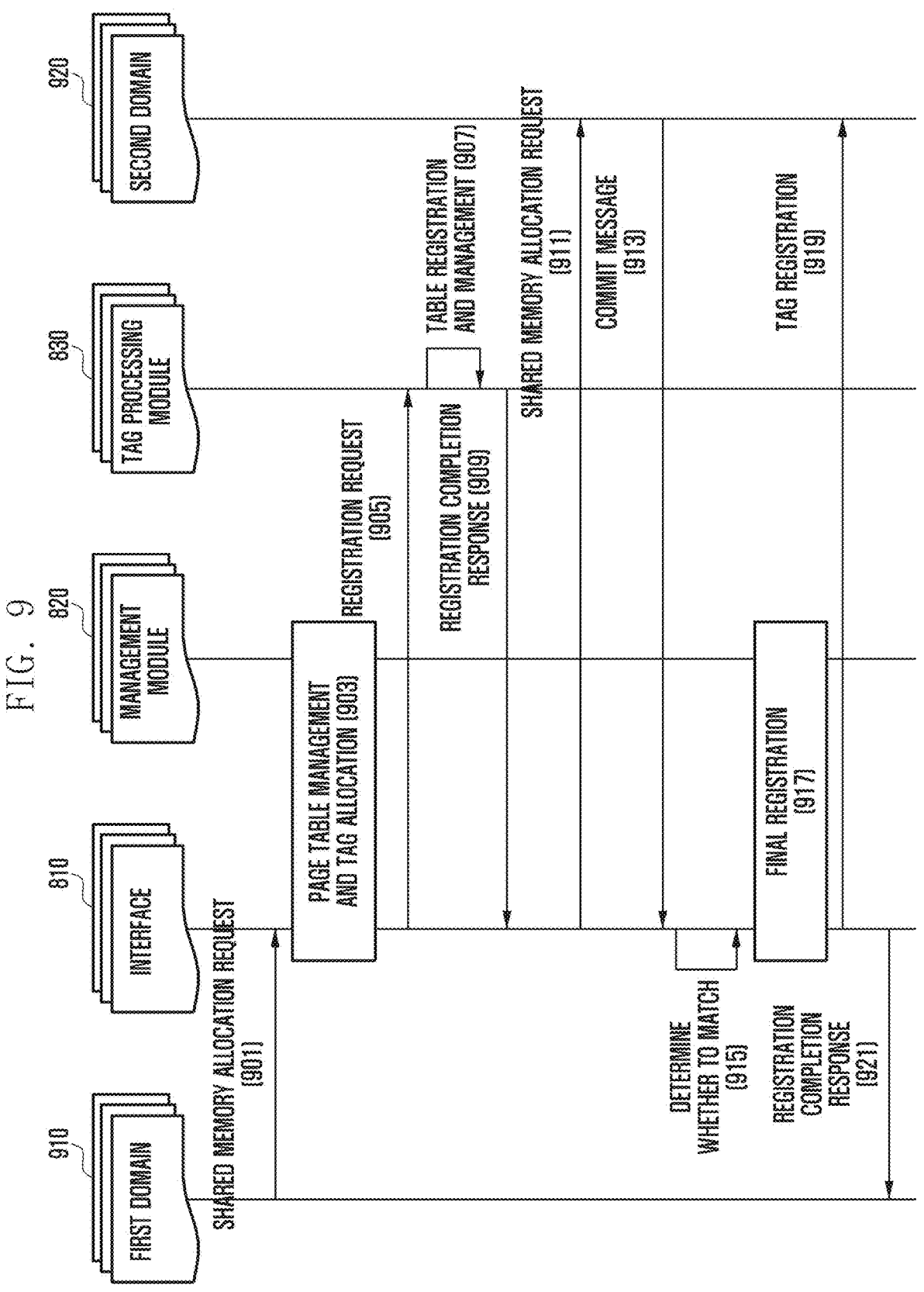
FIG. 9 is a diagram illustrating an operation for detecting a memory safety bug in shared memory in an electronic device according to an embodiment of the disclosure.
Figure 10:
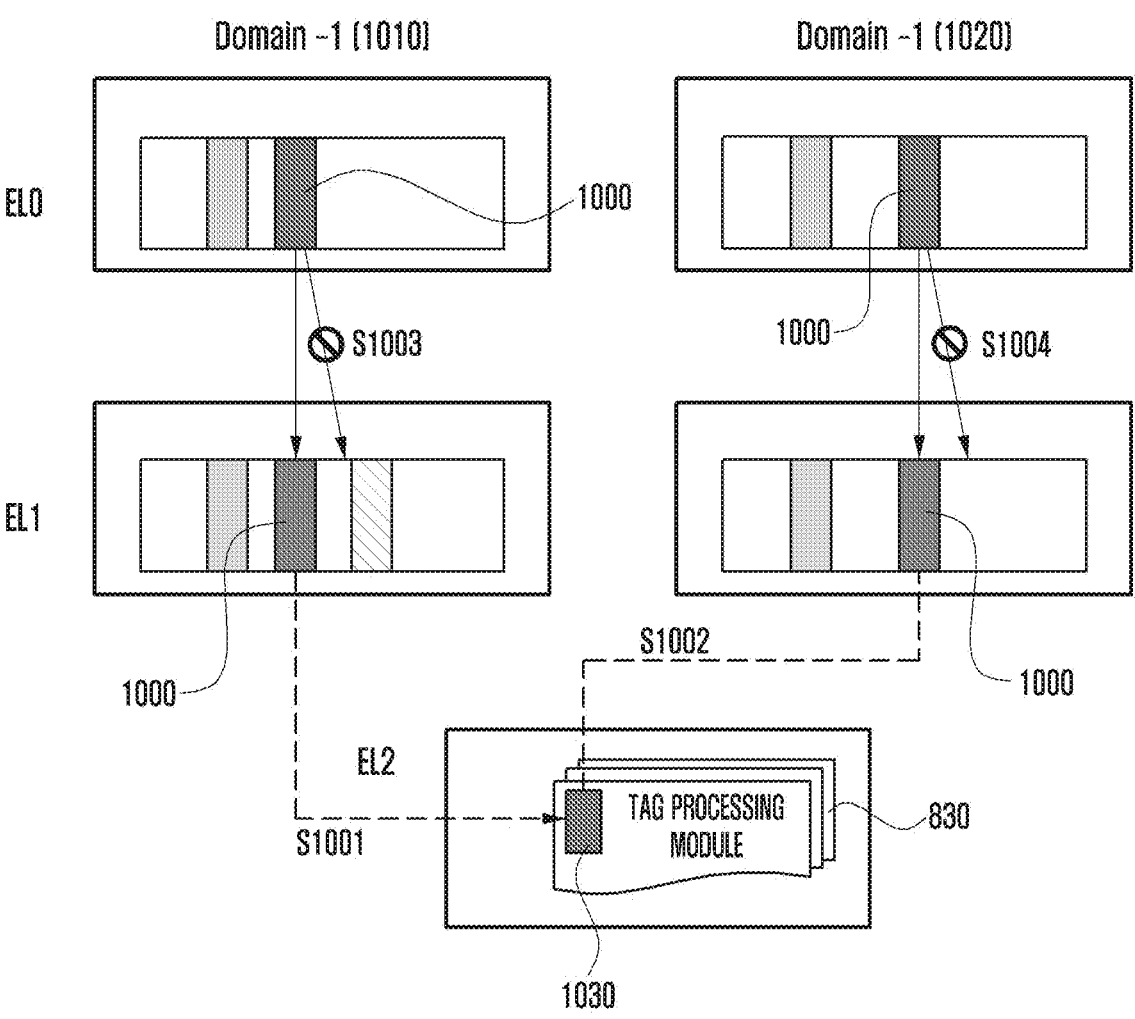
FIG. 10 is a diagram illustrating an operation for detecting a memory safety bug in shared memory in an electronic device according to an embodiment of the disclosure.

FIGS. 9 and 10 are diagrams illustrating an operation for detecting a memory safety bug in shared memory in an electronic device according to various embodiments of the disclosure.

According to an embodiment of the disclosure, FIG. 9 may illustrate an example of an operation of requesting, registering, and managing shared memory in the electronic device 101 according to an embodiment.

In the following embodiment of the disclosure, each operation may be performed sequentially, but is not necessarily performed sequentially. For example, the order of each operation may be changed, and at least two operations may be performed in parallel.

According to an embodiment of the disclosure, FIG. 9 may illustrate an example of an operation when a security service (e.g., user authentication service such as biometric recognition, mobile ID, or payment) is requested from a first domain 910 to a second domain 920. According to an embodiment of the disclosure, commands between multiple domains may be transmitted to, for example, shared memory, such as requesting a security service from the first domain 910 to the second domain 920. According to an embodiment of the disclosure, when the security service is used between multiple domains, a memory area to be used as shared memory may be allocated from the first domain 910 requesting the security service, and registered as the second domain 920. For example, according to an embodiment of the disclosure, the electronic device 101 may detect a memory safety bug for the shared memory through registration of related tags between multiple domains. In the prior art, a tag may be registered only in the first domain 910, and a tag registration may not be possible in the second domain 920, so that a memory safety bug may not be detected.

Referring to FIG. 9, in operation 901, the first domain 910 may transmit shared memory allocation request to the control module 800 (e.g., the interface 810). According to an embodiment of the disclosure, the first domain 910 may transmit the shared memory allocation request according to service execution to the control module 800 for supporting the privileged mode of the EL2 layer. According to an embodiment of the disclosure, the first domain 910 may request shared memory allocation by transmitting memory information (e.g., information indicating {start, size}) on a memory area included belonging to the first domain 910 to the control module 800.

In operation 903, the control module 800 (e.g., the interface 810, the management module 820) may manage a page table and perform tag allocation in response to the shared memory allocation request received from the first domain 910. In an embodiment of the disclosure, the page table may represent a system for converting addresses. For example, the page table may represent a table that stores page information of a process (or task).

According to an embodiment of the disclosure, a page table may exist for every program of the electronic device 101, and the CPU 230 may read information on the table from the start address of the page table. For example, the process's memory may be divided into page units, the actual physical memory may be divided into page units, and the divided physical memory is called a page or page frame. For example, a virtual page number (VPN) may be mapped to a physical frame number (PFN), and a table for such mapping may be called a page table. According to an embodiment of the disclosure, each process may independently have its own page table. According to an embodiment of the disclosure, the page table is managed by the operating system and may be read by hardware (e.g., MMU). The page table according to an embodiment will be described later.

According to an embodiment of the disclosure, the control module 800 may receive the shared memory allocation request of the first domain 910 through the interface 810. According to an embodiment of the disclosure, the interface 810 may transmit the shared memory allocation request to the management module 820 to manage (e.g., generate) the page table. According to an embodiment of the disclosure, the management module 820 of the control module 800 may allocate a tag to a designated memory area of the shared memory through address conversion (e.g., page-walk modification) in the page table. According to an embodiment of the disclosure, the management module 820 may allocate a tag of the shared memory and return the tag to the interface 810.

In operation 905, the interface 810 of the control module 800 may transmit a registration request to the tag processing module 830 of the control module 800 in response to the tag allocation of the shared memory by the management module 820. According to an embodiment of the disclosure, the interface 810 may transmit memory information (e.g., information indicating {start, size}) and tag information to the tag processing module 830 to request registration.

In operation 907, the tag processing module 830 (or tag agent) of the control module 800 may receive the registration request from the interface 810 and configure (e.g., configured as {start, size, tag information}) the page table based on memory information and tag information received along with the registration request to register and manage the shared memory in the page table. For example, the tag processing module 830 may configure a tag for a memory area of the first domain in the shared memory based on memory information and tag information.

In operation 909, the tag processing module 830 of the control module 800 may transmit a registration completion response to the interface 810 in response to completing registration of the page table.

In operation 911, the interface 810 of the control module 800 may receive the registration completion response in which the registration of the shared memory is completed and transmit the shared memory allocation request to the second domain 920.

In operation 913, the second domain 920 may receive the shared memory allocation request from the control module 800 (e.g., the interface 810) and transmit a commit message to the control module 800 (e.g., the interface 810) for mapping the shared memory to the memory area belonging to the second domain 920. According to an embodiment of the disclosure, the second domain 920 may include memory information (e.g., {start, size} information) allocated from the second domain 920 (e.g., memory management/allocator) in the commit message and transmit the same to the interface 810.

In operation 915, the interface 810 of the control module 800 may receive the commit message from the second domain 920, and determine whether the memory area requested to be allocated by the first domain 910 in operation 901 matches the memory area requested to be allocated by the second domain 920 in operation 913. For example, the interface 810 may determine whether memory information requested by the first domain 910 and registered in the tag processing module 830 (e.g., {start, size}information requested by the first domain 910) matches memory information requested by the second domain 920 (e.g., {start, size}information requested by the second domain 920).

In operation 917, the control module 800 (e.g., the interface 810 and the management module 820) may complete the final registration. According to an embodiment of the disclosure, when the memory area requested for allocation in the first domain 910 and the second domain 920 matches, the interface 810 may transmit a registration request to the management module 820, and the management module 820 may complete the final registration of the allocated memory area.

In operation 919, in response to completing the final registration, the interface 810 of the control module 800 may transmit a tag registration request to the second domain 920, and shared memory having the same tag as the tag registered in the first domain 910 may be registered in the second domain 920.

In operation 921, the interface 810 of the control module 800 may transmit the registration completion response to the first domain 910 in response to completing the final registration, and the first domain 910 may receive a response that the registration of the shared memory requested for allocation is completed.

Referring to FIG. 9, the electronic device 101 may register and manage a memory area having the same tag in the first domain 910 and the second domain 920 through the control module 800, and may transmit a response to the registration completion to the first domain 910 and the second domain 920. Through this, the memory area having the same tag in the first domain 910 and the second domain 920 may be registered, and a memory safety bug may be detected for both the first domain 910 and the second domain 920 during shared memory calculation, and the corresponding access may not be allowed unlike the prior art when detecting a memory safety bug. An example of this is illustrated in FIG. 10.

Referring to FIG. 10, the memory area (e.g., shared memory 1000) requested to be allocated by a first domain 1010 (e.g., domain-1) may first be requested to be registered in the control module 800 (e.g., the tag processing module 830) of the EL2 layer to register the memory area in the EL1 layer (e.g., secure OS) of a second domain 1020 (81001). In the EL2 layer, a tag 1030 may be recorded in response to the memory area requested to be allocated by the first domain through the control module 800 (e.g., the tag processing module 830), and in the same manner, the tag 1030 may be registered as the shared memory 1000 in the EL1 layer (e.g., secure OS) of the second domain 1020 (81002). For example, the control module 800 may perform shared memory mapping on the second domain 1020.

According to an embodiment of the disclosure, in the EL1 layer (e.g., secure OS) of the second domain 1020, unlike the operation illustrated in FIG. 6, the second domain 1020 may perform memory allocation and management based on the same tag information as the tag information of the first domain 1010. Through this, it is possible to ensure protection against a memory safety bug approaching through the shared memory 1000 from the second domain 1020. Accordingly, the memory safety bug S1003 in the first domain 910 and a memory safety bug S1004 in the second domain 920 may be detected.

According to an embodiment of the disclosure, an example of a shared memory tag (e.g., the tag 1030) managed by the control module 800 (e.g., the tag processing module 830) of the EL2 layer is illustrated in Table 1.

TABLE 1

| Domain ID | Memory address | Memory size | Memory tag |
|---|---|---|---|
| ID 1 | 0xffff_ffff_0000_0000 | 0x100 | 0xaa |
| ID 3 | 0xffff_ffff_0000_1000 | 0x100 | 0xab |
| ID 2 | 0xffff_ffff_0000_2000 | 0x400 | 0xac |
| ID 4 | 0xffff_ffff_0000_3000 | 0x100 | 0xba |

According to an embodiment of the disclosure, as described in the description part with reference to FIGS. 9 and 10, the EL2 layer of the domain (e.g., the second domain) of the secure world may include the control module 800. According to an embodiment of the disclosure, the control module 800 (or controller) may include the interface 810 (or manager), and the tag processing module 830 (or tag agent). According to an embodiment of the disclosure, the interface 810 may perform a shared memory request and permission check transmitted from another domain of the secure world or another domain (e.g., the first domain) of the non-secure world. According to an embodiment of the disclosure, the electronic device 101 may perform a memory address conversion (e.g., page-walk) procedure on the request received through the interface 810 through the management module 820, and finally register a shared memory tag through the tag processing module 830.

According to an embodiment of the disclosure, as illustrated in Table 1, the tag processing module 830 may configure a shared memory tag including a domain identification number (e.g., a domain ID) of the requested domain, a shared memory address (e.g., a memory address), a shared memory size (e.g., a memory size), and a tag allocated to the corresponding shared memory (e.g., a random tag value (e.g., 16 bits)). In an embodiment of the disclosure, the tag may be defined as a designated value recognizable by software (e.g., the program 140 of FIG. 1), such as a color value representing a designated color or a pattern value representing a designated pattern.

According to an embodiment of the disclosure, the color value may be defined based on a color code associated with various colors. According to an embodiment of the disclosure, the tag may be defined as a code such as "RRGGBB" indicating a designated color. For example, when the tag is represented by the color "red", the code "FF0000" indicating red may be used as the color value, when the tag is indicated by the color "blue", the code "0000FF" indicating blue may be used as the color value, when the tag is indicated by the color "black", the code "000000" indicating black may be used as the color value, and when the tag is indicated by the "white" color, the code "FFFFFF" indicating white may be used as the color value.

According to an embodiment of the disclosure, the pattern value may represent a value defining the pattern. For example, the pattern value may represent a range value of a pattern or the form of pattern identifier that allows software (e.g., the program 140 of FIG. 1) to process (or understand) the structure (e.g., pattern) of a value rather than the form of a specific value.

According to an embodiment of the disclosure, although not included in Table 1, the shared memory tag may further include a conversion address (e.g., stage-2 conversion address) required for intermediate address conversion in the EL2 layer.

According to an embodiment of the disclosure, an electronic device 101 supporting multiple domains may include hardware 430 and 760 including at least one processor (e.g., the CPU 230 of FIG. 2) including processing circuitry operable in a first domain and a second domain and memory 130 storing instructions that cause the electronic device 101 to perform operations when executed individually and/or collectively by at least one processor.

According to an embodiment of the disclosure, the instructions, when executed by the CPU 230, may cause the electronic device 101 to detect a shared memory use request by the first domain or the second domain. According to an embodiment of the disclosure, the instructions, when executed by the CPU 230, may cause the electronic device 101 to allocate shared memory for communication between multiple domains including the first domain and the second domain based on a memory area designated in the memory 130, based on the shared memory use request. According to an embodiment of the disclosure, the instructions, when executed by the CPU 230, may cause the electronic device 101 to register a tag for the shared memory in a first memory area of the first domain and a second memory area of the second domain. According to an embodiment of the disclosure, the instructions, when executed by the CPU 230, may cause the electronic device 101 to detect a memory safety bug for the shared memory shared between the first domain and the second domain, based on the tag.

According to an embodiment of the disclosure, the multiple domains may include a domain of a non-secure world 410 and a domain of a secure world 420. According to an embodiment of the disclosure, the domain of the non-secure world 410 and the domain of the secure world 420 may include one or more domains.

According to an embodiment of the disclosure, the instructions may cause the electronic device 101 to detect a memory safety bug for the shared memory by using memory tagging extension (MTE) capable of detecting a memory safety bug through the hardware 430 and 760.

According to an embodiment of the disclosure, each of the multiple domains may include a software layer and a hardware layer. According to an embodiment of the disclosure, the hardware layer may be shared for the multiple domains. According to an embodiment of the disclosure, the software layer may be divided by the multiple domains and include an application layer 440, an operating system layer 450, a virtualization layer 460, and a monitor layer 470.

According to an embodiment of the disclosure, the virtualization layer 460 may operate in a privileged mode allowing performing of limited operations of the shared memory, and include a controller 800 (e.g., the control module 800) monitoring and detecting a memory safety bug that invade between the multiple domains.

According to an embodiment of the disclosure, the controller 800 may process operations to request, register, manage, and/or deny the shared memory.

According to an embodiment of the disclosure, the controller 800 may include an interface 810 checking memory requests, permissions, and tag information. According to an embodiment of the disclosure, the controller 800 may include a manager (e.g., the management module 820) processing requests transmitted through the interface. According to an embodiment of the disclosure, the controller 800 may include a tag agent (e.g., the tag processing module 830) detecting a memory safety bug for the shared memory.

According to an embodiment of the disclosure, the tag agent may manage a table based on the identification number of a domain requesting allocation of a memory area for shared memory, a memory address, a memory size, a tag requested for allocation to shared memory, and/or a conversion address.

According to an embodiment of the disclosure, the controller 800 may receive a shared memory allocation request from the first domain of the multiple domains. According to an embodiment of the disclosure, the controller 800 may manage a table for address conversion and allocate tags for shared memory through address conversion in the table. According to an embodiment of the disclosure, the controller 800 may configure a shared memory tag in the shared memory based on tag information related to the allocated tag. According to an embodiment of the disclosure, the controller 800 may transmit the shared memory allocation request to the second domain of the multiple domains. According to an embodiment of the disclosure, the controller 800 may receive a commit message from the second domain.

According to an embodiment of the disclosure, the controller 800 may determine whether the memory area requested for allocation in the first domain matches the memory area requested for allocation in the second domain. According to an embodiment of the disclosure, the controller 800 may complete final registration for the shared memory when the memory areas requested for allocation match each other. According to an embodiment of the disclosure, the controller 800 may transmit a registration completion response for the shared memory having the same shared memory tag in the first domain and the second domain to the first domain and the second domain.

According to an embodiment of the disclosure, a memory area having the same tag in the shared memory may be registered by the first domain and the second domain.

According to an embodiment of the disclosure, the controller 800 may detect a memory safety bug for each of the multiple domains based on the registered tag. According to an embodiment of the disclosure, the control module 800 may deny access to the memory area by the corresponding domain due to tag mismatch when a memory safety bug is detected.

According to an embodiment of the disclosure, the hardware 430 and 760 may include a first processor (e.g., the CPU 230 of FIG. 2) that stores executable instructions and is programmable to execute the instructions. According to an embodiment of the disclosure, the hardware 430 and 760 may include a second processor (e.g., MMU) managing memory allocation and deallocation for each of the multiple domains. According to an embodiment of the disclosure, the first processor and the second processor may be shared between multiple domains.

According to an embodiment of the disclosure, the memory 130 may include a dynamic memory used in the operation of the first processor.

Hereinafter, methods of operating the electronic device 101 in various embodiments will be described in detail. Operations performed by the electronic device 101 according to various embodiments may be executed by the processor 120 including various processing circuitry and/or executable program elements of the electronic device 101. According to an embodiment of the disclosure, operations performed by the electronic device 101 may be stored as instructions in the memory 130 and may be individually and/or collectively performed by the processor 120.

Figure 11:
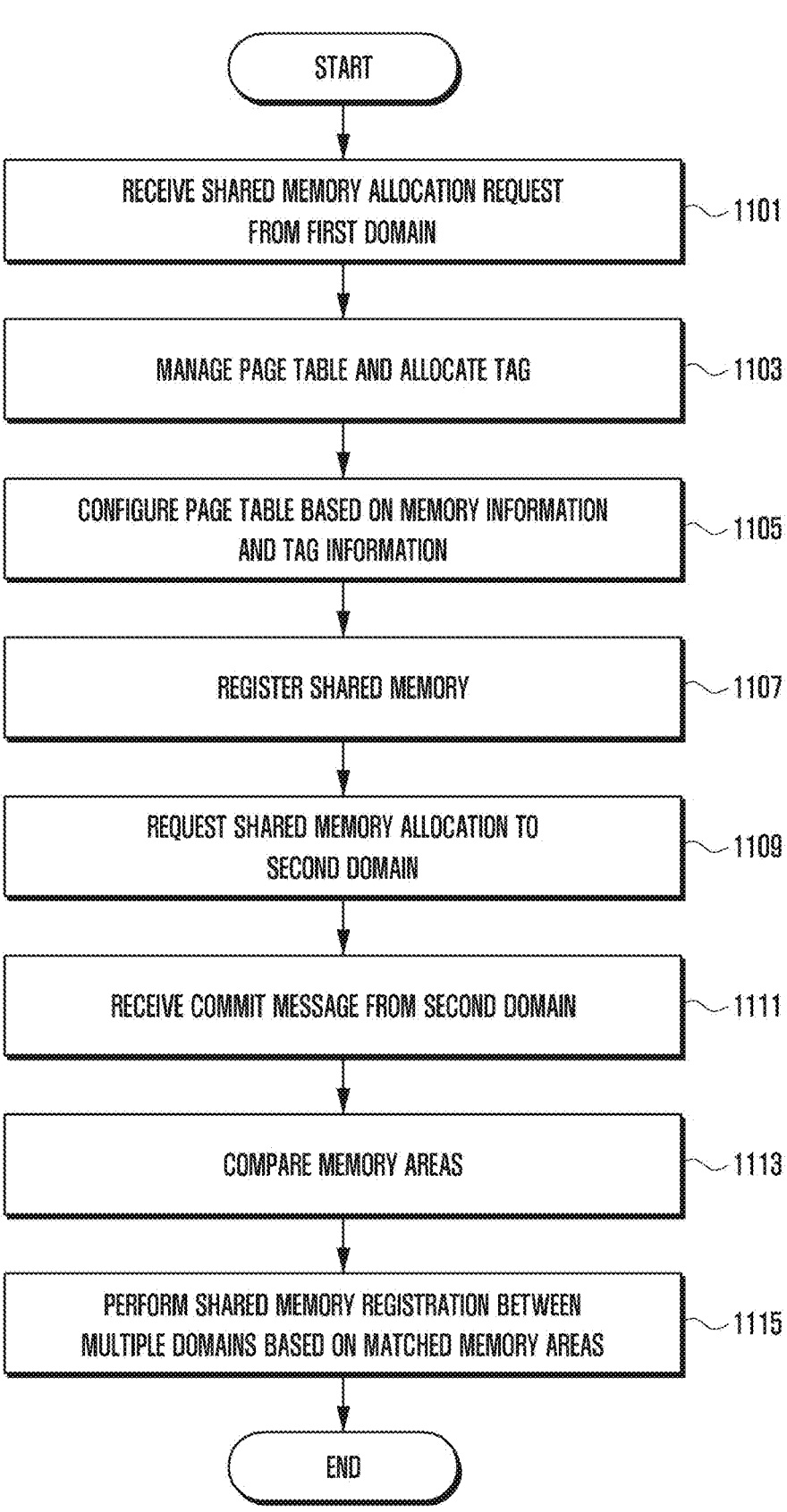
FIG. 11 is a flowchart illustrating an operation method of an electronic device according to an embodiment of the disclosure.

FIG. 11 is a flowchart illustrating an operation method of an electronic device according to an embodiment of the disclosure.

Referring to FIG. 11, it may illustrate an example of an operation of allocating, registering, and managing shared memory between multiple domains in the electronic device 101 according to an embodiment.

The operation method supported by the electronic device 101 (e.g., the control module 800 (or controller) of FIG. 8 or FIG. 9) according to an embodiment of the disclosure may be performed, for example, according to the flowchart illustrated in FIG. 11. The flowchart illustrated in FIG. 11 is an example of the operation of the electronic device 101 according to an embodiment of the disclosure, and the order of at least some of the operations may be changed, performed in parallel, performed as independent operations, or at least some other operations may be performed complementary to at least some of the operations. According to an embodiment of the disclosure, operations 1101 to 1155 may be performed in a control module (e.g., the control module 800 (or controller) of FIG. 8 or FIG. 9) and/or at least one processor (e.g., the processor 120 of FIG. 1 or FIG. 2) of the electronic device 101.

According to an embodiment of the disclosure, for example, the operations described in FIG. 11 may be heuristically performed in combination with the operations described in FIGS. 7 to 10, heuristically performed by replacing at least some operations of the described operation and combining the same with at least some other operations, or heuristically performed as a detailed operation of at least some of the operations described.

Referring to FIG. 11, the operation method performed by the electronic device 101 according to an embodiment of the disclosure may include receiving a shared memory allocation request from the first domain in operation 1101, performing page table management and tag allocation in operation 1103, configuring a page table based on memory information and tag information in operation 1105, registering shared memory in operation 1107, requesting shared memory allocation to the second domain in operation 1109, receiving a commit message from the second domain in operation 1111, comparing memory areas in operation 1113, and performing shared memory registration between multiple domains based on memory area matching in operation 1115.

Referring to FIG. 11, in operation 1101, the control module 800 (or controller) of the electronic device 101 may receive a shared memory allocation request from the first domain. According to an embodiment of the disclosure, the first domain may transmit the shared memory allocation request to the control module 800 of the EL2 layer according to service (or application) execution. According to an embodiment of the disclosure, the shared memory allocation request of the first domain may include memory information (e.g., information indicating {start, size}) on the memory area belonging to the first domain.

In operation 1103, the control module 800 may perform page table management and tag allocation. According to an embodiment of the disclosure, the control module 800 may allocate a shared memory tag to a designated memory area of the shared memory in the page table in response to the shared memory allocation request from the first domain.

In operation 1105, the control module 800 may configure the page table based on memory information and tag information. According to an embodiment of the disclosure, in response to the shared memory tag being allocated, the control module 800 may register memory information (e.g., information indicating {start, size}) and tag information (e.g., random tag value (e.g., color value or pattern value)).

In operation 1107, the control module 800 may register shared memory. According to an embodiment of the disclosure, the control module 800 may configure a page table (e.g., composed of {start, size, tag information}), and register and manage the shared memory in the page table. For example, the control module 800 may configure a shared memory tag for the memory area of the first domain in the shared memory based on memory information and tag information.

In operation 1109, the control module 800 may request shared memory allocation to the second domain. According to an embodiment of the disclosure, the control module 800 may transmit the shared memory allocation request to the second domain of the multiple domains in response to completing the shared memory registration.

In operation 1111, the control module 800 may receive a commit message from the second domain. According to an embodiment of the disclosure, in response to the shared memory allocation request from the control module 800, the second domain may transmit a commit message for shared memory mapping to the memory area belonging to the second domain to the control module 800. According to an embodiment of the disclosure, the commit message may include memory information (e.g., {start, size}information) allocated in the second domain.

In operation 1113, the control module 800 may compare memory areas. According to an embodiment of the disclosure, in response to receiving the commit message, the control module 800 may determine whether the memory area requested for allocation by the first domain matches the memory area requested for allocation by the second domain. For example, the control module 800 may determine whether memory information (e.g., {start, size}information requested by the first domain) requested by the first domain and managed by the control module 830 matches memory information (e.g., {start, size}information requested by the second domain) requested through the commit message by the second domain.

In operation 1115, the control module 800 may perform shared memory registration between multiple domains based on the memory area matching. According to an embodiment of the disclosure, when the memory areas requested for allocation by the first domain and the second domain match each other, the control module 800 may complete final registration for the memory area requested for allocation. According to an embodiment of the disclosure, in response to completing final registration, the control module 800 may transmit a response regarding completion of shared memory registration to the first domain and the second domain. For example, the control module 800 may transmit a tag registration request to the second domain, and in the second domain, shared memory with the same tag as the tag registered in the first domain may be registered. For example, the control module 800 may transmit a registration completion response to the first domain, and the first domain may identify that registration of the shared memory requested for allocation is complete.

FIG. 12 is a flowchart illustrating a method of operating an electronic device according to an embodiment of the disclosure.

Referring to FIG. 12, it may illustrate an example of an operation of allocating shared memory between multiple domains (e.g., the first domain and the second domain) and detecting a memory safety bug for the shared memory in the electronic device 101 according to an embodiment.

The operation method supported by the electronic device 101 (e.g., the control module 800 (or controller) of FIG. 8 or FIG. 9) according to an embodiment of the disclosure may be performed, for example, according to the flowchart illustrated in FIG. 12. The flowchart illustrated in FIG. 12 is an example of the operation of the electronic device 101 according to an embodiment of the disclosure, and the order of at least some of the operations may be changed, performed in parallel, performed as independent operations, or at least some other operations may be performed complementary to at least some of the operations. According to an embodiment of the disclosure, operations 1201 to 1207 may be performed in a control module (e.g., the control module 800 (or controller) of FIG. 8 or FIG. 9) and/or at least one processor (e.g., the processor 120 of FIG. 1 or FIG. 2) of the electronic device 101.

According to an embodiment of the disclosure, for example, the operations described in FIG. 12 may be heuristically performed in combination with the operations described in FIGS. 7 to 11, heuristically performed by replacing at least some operations of the described operation and combining the same with at least some other operations, or heuristically performed as a detailed operation of at least some of the operations described.

Referring to FIG. 12, the operation method performed by the electronic device 101 according to an embodiment of the disclosure may include, detecting a shared memory use request by the first domain or the second domain in operation 1201, allocating shared memory for communication between multiple domains including the first domain and the second domain based on a memory area designated in the memory, based on the shared memory use request in operation 1203, registering a tag for the shared memory in a first memory area of the first domain and a second memory area of the second domain in operation 1205, and detecting a memory safety bug for the shared memory shared between the first domain and the second domain, based on the tag in operation 1207.

Referring to FIG. 12, in operation 1201, the control module 800 (or controller) of the electronic device 101 may detect a shared memory use request by the first domain or the second domain. According to an embodiment of the disclosure, the control module 800 may receive a shared memory allocation request according to execution of a service (or application) from the first domain or the second domain. According to an embodiment of the disclosure, the shared memory allocation request may include memory information (e.g., information indicating {start, size}) on the memory area (e.g., the first memory area or the second memory area) belonging to the corresponding domain (e.g., the first domain or the second domain).

In operation 1203, based on the shared memory use request, the control module 800 may allocate shared memory for communication between multiple domains including the first domain and the second domain based on the memory area designated in the memory 130. According to an embodiment of the disclosure, the control module 800 may designate a partial area of the memory 130 of the electronic device 101 to allocate shared memory for communication between multiple domains (e.g., the first domain and the second domain).

In operation 1205, the control module 800 may register a tag for the shared memory in the first memory area of the first domain and the second memory area of the second domain. According to an embodiment of the disclosure, the control module 800 may allocate a tag to a designated memory area of the shared memory in response to the shared memory use request. According to an embodiment of the disclosure, the control module 800 may operate to configure the same tag for the shared memory in each memory area of the multiple domain based on memory information (e.g., information indicating {start, size}) for each memory area belonging to multiple domains (e.g., the first domain and the second domain) related to the use of the shared memory.

According to an embodiment of the disclosure, the control module 800 may compare memory information (e.g., {start, size}information requested to be allocated by the first domain) of the first domain with memory information (e.g., {start, size}information requested to be allocated by the second domain) of the second domain. According to an embodiment of the disclosure, when the memory areas requested to be allocated from the first domain and the second domain match each other, the control module 800 may operate to register shared memory in which the first domain and the second domain have the same tag.

In operation 1207, the control module 800 may perform an operation of detecting a memory safety bug for the shared memory shared between the first domain and the second domain based on the tag.

According to an embodiment of the disclosure, as described in the description with reference to FIG. 12, related operations (e.g., reading, comparing, and/or detecting) may be performed by monitoring tags for shared memory through the control module 800. According to an embodiment of the disclosure, as described in the description with reference to FIGS. 4 and 5, operations corresponding to the control module 800 may perform related operations (e.g., reading, comparing, and/or detecting) by monitoring the tag upon access to the shared memory through the hardware 430 including the MMU.

According to an embodiment of the disclosure, an operation method performed by an electronic device 101 supporting multiple domains may include detecting a shared memory use request by the first domain or the second domain. According to an embodiment of the disclosure, the operation method may include allocating shared memory for communication between multiple domains including the first domain and the second domain based on a memory area designated in the memory 130, based on the shared memory use request. According to an embodiment of the disclosure, the operation method may include registering a tag for the shared memory in a first memory area of the first domain and a second memory area of the second domain. According to an embodiment of the disclosure, the operation method may include detecting a memory safety bug for the shared memory shared between the first domain and the second domain, based on the tag.

According to an embodiment of the disclosure, the multiple domains may include a domain of a non-secure world 410 and a domain of a secure world 420. According to an embodiment of the disclosure, the domain of the non-secure world 410 and the domain of the secure world 420 may include one or more domains.

According to an embodiment of the disclosure, the operation method may include detecting a memory safety bug for the shared memory by using memory tagging extension (MTE) capable of detecting a memory safety bug through the hardware 430 and 760.

According to an embodiment of the disclosure, each of the multiple domains may include a software layer and a hardware layer. According to an embodiment of the disclosure, the hardware layer may be shared for the multiple domains.

According to an embodiment of the disclosure, the software layer may be divided by the multiple domains and include an application layer 440, an operating system layer 450, a virtualization layer 460, and a monitor layer 470.

According to an embodiment of the disclosure, the virtualization layer 460 may operate in a privileged mode allowing performing of limited operations of the shared memory, and include a controller (e.g., the control module 800) monitoring and detecting a memory safety bug that invade between the multiple domains.

According to an embodiment of the disclosure, the operation method may include operations of requesting, registering, managing, and/or denying the shared memory by the controller.

According to an embodiment of the disclosure, the operation method may include receiving a shared memory allocation request from the first domain of the multiple domains. According to an embodiment of the disclosure, the operation method may include managing a table for address conversion and allocating tags for shared memory through address conversion in the table. According to an embodiment of the disclosure, the operation method may include configuring a shared memory tag in the shared memory based on tag information related to the allocated tag. According to an embodiment of the disclosure, the operation method may include transmitting the shared memory allocation request to the second domain of the multiple domains. According to an embodiment of the disclosure, the operation method may include receiving a commit message from the second domain.

According to an embodiment of the disclosure, the operation method may include determining whether the memory area requested for allocation in the first domain matches the memory area requested for allocation in the second domain. According to an embodiment of the disclosure, the operation method may include completing final registration for the shared memory when the memory areas requested for allocation match each other. According to an embodiment of the disclosure, the operation method may include transmitting a registration completion response for shared memory having the same shared memory tag in the first domain and the second domain to the first domain and the second domain.

According to an embodiment of the disclosure, the operation method may include registering memory area having the same tag in the shared memory by the first domain and the second domain.

According to an embodiment of the disclosure, the operation method may include detecting a memory safety bug for each of the multiple domains based on the registered tag. According to an embodiment of the disclosure, the operation method may include denying access to the memory area by the corresponding domain due to tag mismatch when a memory safety bug is detected.

In a non-transitory computer-readable medium storing instructions that cause the CPU 230 to perform operations when executed by the CPU 230 of the electronic device 101 according to an embodiment of the disclosure, the instructions, when executed by the processor, may cause the electronic device to perform detecting a shared memory use request by the first domain or the second domain, allocating shared memory for communication between multiple domains including the first domain and the second domain based on a memory area designated in the memory 130, based on the shared memory use request, registering a tag for the shared memory in a first memory area of the first domain and a second memory area of the second domain, and detecting a memory safety bug for the shared memory shared between the first domain and the second domain, based on the tag.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiment of the disclosure s, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device supporting multiple domains, the electronic device comprising:
memory storing one or more computer programs; and
one or more processors communicatively coupled to the memory and operable in a first domain and a second domain and comprising processing circuitry,
wherein the one or more computer programs include computer-executable instructions that, when executed by the one or more processors individually or collectively, cause the electronic device to:
detect a shared memory use request by the first domain or the second domain,
allocate shared memory for communication between multiple domains comprising the first domain and the second domain based on a memory area designated in the memory, based on the shared memory use request,
register a tag for the shared memory in a first memory area of the first domain and a second memory area of the second domain, and
detect a memory safety bug for the shared memory shared between the first domain and the second domain, based on the tag.

2. The electronic device of claim 1,
wherein the multiple domains comprise a non-secure world domain and a secure world domain, and
wherein the non-secure world domain and the secure world domain comprise one or more domains.

3. The electronic device of claim 1, wherein the one or more computer programs further include computer-executable instructions that, when executed by the one or more processors individually or collectively, cause the electronic device to detect a memory safety bug for the shared memory by using memory tagging extension (MTE) capable of detecting a memory safety bug through hardware.

4. The electronic device of claim 1,
wherein each of the multiple domains comprises a software layer and a hardware layer,
wherein the hardware layer is shared for the multiple domains, and
wherein the software layer is divided by the multiple domains and comprises an application layer, an operating system layer, a virtualization layer, and a monitor layer.

5. The electronic device of claim 4,
wherein the virtualization layer is configured to operate in a privileged mode allowing performing of limited operations of the shared memory, and
wherein the virtualization layer comprises a controller monitoring and detecting a memory safety bug that invade between the multiple domains.

6. The electronic device of claim 5, wherein the one or more computer programs further include computer-executable instructions that, when executed by the one or more processors individually or collectively, cause the electronic device to process operations to request, register, manage, and/or deny the shared memory.

7. The electronic device of claim 5, wherein the controller comprises:
an interface checking memory requests, permissions, and tag information;
a manager processing requests transmitted through the interface; and a tag agent detecting a memory safety bug for the shared memory.

8. The electronic device of claim 7, wherein the tag agent is configured to manage a table based on an identification number of a domain requesting allocation of a memory area for shared memory, a memory address, a memory size, a tag requested for allocation to the shared memory, and/or a conversion address.

9. The electronic device of claim 7, wherein the one or more computer programs further include computer-executable instructions that, when executed by the one or more processors individually or collectively, cause the electronic device to:

receive a shared memory allocation request from the first domain of the multiple domains, manage a table for address conversion and allocate tags for shared memory through address conversion in the table, configure a shared memory tag in the shared memory based on tag information related to the allocated tag, transmit the shared memory allocation request to the second domain of the multiple domains, receive a commit message from the second domain, determine whether the memory area requested for allocation in the first domain matches the memory area requested for allocation in the second domain, complete final registration for the shared memory when the memory areas requested for allocation match each other, and transmit a registration completion response for the shared memory having an identical shared memory tag in the first domain and the second domain to the first domain and the second domain.

10. The electronic device of claim 9, wherein a memory area having an identical tag in the shared memory is registered by the first domain and the second domain.

11. The electronic device of claim 9, wherein the one or more computer programs further include computer-executable instructions that, when executed by the one or more processors individually or collectively, cause the electronic device to:

detect a memory safety bug for each of the multiple domains based on the registered tag, and deny access to the memory area by the corresponding domain due to tag mismatch when a memory safety bug is detected.

12. The electronic device of claim 1, further comprising a hardware including:

a first processor configured to store executable instructions and be programmable to execute the instructions, and a second processor configured to manage memory allocation and deallocation for each of the multiple domains, wherein the first processor and the second processor are shared between multiple domains.

13. The electronic device of claim 12, wherein the memory comprises dynamic memory used in the operation of the first processor.

14. A method of operating an electronic device supporting multiple domains, the method comprising:

detecting a shared memory use request by a first domain or a second domain;

allocating shared memory for communication between multiple domains comprising the first domain and the second domain based on a memory area designated in the memory, based on the shared memory use request;

registering a tag for the shared memory in a first memory area of the first domain and a second memory area of the second domain; and detecting a memory safety bug for the shared memory shared between the first domain and the second domain, based on the tag.

15. The method of claim 14, wherein the multiple domains comprise a non-secure world domain and a secure world domain, and wherein the non-secure world domain and the secure world domain comprise one or more domains.

16. The method of claim 14, further comprising:

detecting a memory safety bug for the shared memory by using memory tagging extension (MTE) capable of detecting a memory safety bug through hardware.

17. The method of claim 14, wherein each of the multiple domains comprises a software layer and a hardware layer, wherein the hardware layer is shared for the multiple domains, wherein the software layer is divided by the multiple domains and comprises an application layer, an operating system layer, a virtualization layer, and a monitor layer, wherein the virtualization layer is configured to operate in a privileged mode allowing performing of limited operations of the shared memory, wherein the virtualization layer comprises a controller monitoring and detecting a memory safety bug that invade between the multiple domains, and further comprising:

performing, by the controller, operations of requesting, registering, managing, and/or denying the shared memory.

18. The method of claim 17, further comprising:

receiving a shared memory allocation request from the first domain of the multiple domains;

managing a table for address conversion and allocating tags for shared memory through address conversion in the table;

configuring a shared memory tag in the shared memory based on tag information related to the allocated tag;

transmitting the shared memory allocation request to the second domain of the multiple domains;

receiving a commit message from the second domain;

determining whether the memory area requested for allocation in the first domain matches the memory area requested for allocation in the second domain;

completing final registration for the shared memory when the memory areas requested for allocation match each other; and transmitting a registration completion response for the shared memory having an identical shared memory tag in the first domain and the second domain to the first domain and the second domain.

19. The method of claim 18, further comprising:

registering a memory area having an identical tag in the shared memory by the first domain and the second domain, detecting a memory safety bug for each of the multiple domains based on the registered tag, and denying access to the memory area by the corresponding domain due to tag mismatch when a memory safety bug is detected.

20. One or more non-transitory computer-readable storage media storing computer-executable instructions that, when executed by one or more processors of an electronic device individually or collectively, cause the one or more processors to perform operations, the operations comprising:

detecting a shared memory use request by a first domain or a second domain;

allocating shared memory for communication between multiple domains comprising the first domain and the second domain based on a memory area designated in the memory, based on the shared memory use request;

registering a tag for the shared memory in a first memory area of the first domain and a second memory area of the second domain; and detecting a memory safety bug for the shared memory shared between the first domain and the second domain, based on the tag.

* * * * *